United States Patent
Otake et al.

(10) Patent No.: US 12,181,647 B2
(45) Date of Patent: Dec. 31, 2024

(54) VARIABLE FOCAL DISTANCE LENS SYSTEM AND IMAGING DEVICE

(71) Applicant: SONY GROUP CORPORATION, Tokyo (JP)

(72) Inventors: Motoyuki Otake, Tokyo (JP); Takumi Matsui, Tokyo (JP); Manabu Ishioka, Tokyo (JP); Christin Weichelt, Stuttgart (DE); Hiroshi Ushida, Tokyo (JP); Markus Kamm, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 425 days.

(21) Appl. No.: 17/431,501

(22) PCT Filed: Dec. 25, 2019

(86) PCT No.: PCT/JP2019/050965
§ 371 (c)(1),
(2) Date: Aug. 17, 2021

(87) PCT Pub. No.: WO2020/174865
PCT Pub. Date: Sep. 3, 2020

(65) Prior Publication Data
US 2022/0146799 A1 May 12, 2022

(30) Foreign Application Priority Data
Feb. 27, 2019 (JP) .................. 2019-034876

(51) Int. Cl.
*G02B 15/14* (2006.01)
*G02B 3/02* (2006.01)

(52) U.S. Cl.
CPC ........... *G02B 15/1431* (2019.08); *G02B 3/02* (2013.01)

(58) Field of Classification Search
CPC .......... G02B 3/02; G02B 13/00; G02B 13/02; G02B 13/18; G02B 15/00; G02B 15/1431;
(Continued)

(56) References Cited

U.S. PATENT DOCUMENTS 3,305,294 A 2/1967 Alvarez
3,583,790 A 6/1971 Baker
(Continued)

FOREIGN PATENT DOCUMENTS

AT 279921 B 3/1970
CH 481387 A 11/1969
(Continued)

OTHER PUBLICATIONS

International Search Report and Written Opinion of PCT Application No. PCT/JP2019/050965, issued on Feb. 25, 2020, 11 pages of ISRWO.

*Primary Examiner* — Stephone B Allen
*Assistant Examiner* — Daniel Jeffery Jordan
(74) *Attorney, Agent, or Firm* — CHIP LAW GROUP

(57) ABSTRACT

A first lens unit and a third lens unit are constituted by a lens which is rotationally symmetrical with respect to an optical axis and are disposed on the same optical axis, a first freeform-curved surface lens and a second freeform-curved surface lens have the same shape and are disposed to be rotated at 180 degrees with respect to the optical axis. Further, a refractive power of a second lens unit is variable due to the first freeform-curved surface lens and the second freeform-curved surface lens moving in opposite directions. The first freeform-curved surface lens and the second freeform-curved surface lens are moved in the Y-axis direction in association with movement of some of lens groups constituting the first lens unit and the third lens unit when (Continued)

positional states of the lenses are changed from a wide-angle end state to a telephoto end state.

7 Claims, 17 Drawing Sheets

(58) Field of Classification Search
CPC .............. G02B 15/1461; G02B 15/144; G02B 15/144113
USPC ............... 359/422, 432, 676, 680, 686, 689, 359/695–698, 708, 721, 745, 749
See application file for complete search history.

(56) References Cited

U.S. PATENT DOCUMENTS

| | | | |
|---|---|---|---|
| 4,836,661 A | | 6/1989 | Ikemori |
| 8,801,197 B2* | | 8/2014 | Morikuni ............. G03B 21/142 |
| | | | 359/716 |
| 2014/0204472 A1 | | 7/2014 | Dingjan |
| 2014/0285905 A1* | | 9/2014 | Zhou ........................ G02B 7/10 |
| | | | 359/696 |
| 2016/0349495 A1* | | 12/2016 | Pretorius ............ G02B 27/0025 |

FOREIGN PATENT DOCUMENTS

| | | |
|---|---|---|
| DE | 1290357 B | 3/1969 |
| EP | 2726917 A1 | 5/2014 |
| JP | 59-116710 A | 7/1984 |
| JP | 04-43311 A | 2/1992 |
| JP | 2007-004063 A | 1/2007 |
| JP | 2009-505166 A | 2/2009 |
| WO | 2013/001299 A1 | 1/2013 |

* cited by examiner

VARIABLE FOCAL DISTANCE LENS SYSTEM AND IMAGING DEVICE

CROSS REFERENCE TO RELATED APPLICATIONS

This application is a U.S. National Phase of International Patent Application No. PCT/JP2019/050965 filed on Dec. 25, 2019, which claims priority benefit of Japanese Patent Application No. JP 2019-034876 filed in the Japan Patent Office on Feb. 27, 2019. Each of the above-referenced applications is hereby incorporated herein by reference in its entirety.

TECHNICAL FIELD

The present technology relates to a variable focal distance lens system used in a digital video camera, a digital still camera, and the like, and an imaging device using such a variable focal distance lens system. In particular, the present technology is suitable for zoom lenses having an angle of view of approximately 24 mm to 38 mm (35 mm equivalent) in a wide-angle end state where the angle of view is maximized, an F number of approximately 1.8 to 4.0, and a zoom ratio of approximately 10 to 30 times.

BACKGROUND ART

Hitherto, a method of recording a subject image formed on the surface of an imaging element by converting the amount of light of the subject image into an electrical output by each photoelectric conversion element, by means of the imaging element using a photoelectric conversion element such as a charge coupled device (CCD) or a complementary metal oxide semiconductor (CMOS) as recording means in a camera has become known.

With the recent technological progress in microfabrication technology, an increase in the speed of a central processing unit (CPU) and high integration of storage media have been achieved, so that large-capacity image data that could not be handled so far has been able to be processed at high speed. In particular, with an increase in the speed of a CPU, aberration correction such as distortion aberration or chromatic aberration of magnification has been performed in a main body after imaging.

Incidentally, a zoom lens of the related art includes a plurality of movable lens groups, and a focal distance is changed while keeping the position of an image surface constant by moving the variable lens groups in an optical axis direction (see, for example, PTL 1).

The zoom lens disclosed in PTL 1 includes a first lens group having a positive refractive power, a second lens group having a negative refractive power, a third lens group having a positive refractive power, and a fourth lens group having a positive refractive power in this order from an object side to an image side. In the zoom lens, when a focal distance is changed, the first lens group and the third lens group are fixed, the second lens group is moved in an optical axis direction, and the fourth lens group is moved in the optical axis direction to compensate for a change in the position of an image surface accompanying this.

On the other hand, a slide type variable focal distance lens system that changes an angle of view by moving a freeform-curved surface lens having no rotationally symmetric axis in a direction perpendicular to an optical axis has become known (see, for example, PTL 2). In the variable focal distance lens system disclosed in PTL 2, a zooming operation is performed by the movement of four freeform-curved surface lenses.

CITATION LIST

Patent Literature

[PTL 1] JP H4-43311 A
[PTL 2] JP 2007-4063 A

SUMMARY

Technical Problem

However, in zoom lenses of the related art, there is a limit to shortening of the overall lens length.

In a variable focal distance lens system using the freeform-curved surface lenses that have been proposed so far, for example, in the lens system disclosed in PTL 2, magnification is changed by disposing two freeform-curved surface lenses at each of two locations to separate the lenses into a zoom portion and a compensator portion and moving the portions in different directions.

However, since there are a large number of freeform-curved surface lenses, that is, four freeform-curved surface lenses, and freeform-curved surfaces are difficult to process, it is difficult to obtain a stable optical quality during manufacture. In addition, the freeform-curved surface lenses are moved independently, which leads to a problem that it is also difficult to control the positions thereof.

Consequently, according to the variable focal distance lens system and the imaging device of the present technology, an object of the present technology is to provide a small and high-magnification variable focal distance lens system and imaging device.

Solution to Problem

Firstly, a variable focal distance lens system according to the present technology includes a first lens unit constituted by at least one lens group, a second lens unit constituted by a first freeform-curved surface lens and a second freeform-curved surface lens, and a third lens unit constituted by at least one lens group, the variable focal distance lens system including the first to third lens units in this order from an object side to an image side, in which the first lens unit and the third lens unit are constituted by a lens having a shape rotationally symmetrical with respect to an optical axis and are disposed on the same optical axis, the first freeform-curved surface lens and the second freeform-curved surface lens are formed to have the same shape and are disposed to be rotated by 180 degrees from each other about an optical axis, the first freeform-curved surface lens and the second freeform-curved surface lens are movable in a Y-axis direction when optical axes of the first lens unit and the third lens unit are set to be a Z-axis, an axis perpendicular to the Z-axis on an image surface is set to be a Y-axis, and an axis perpendicular to the Y-axis and the Z-axis on the image surface is set to be an X-axis, a refractive power of the second lens unit is variable due to the first freeform-curved surface lens and the second freeform-curved surface lens moving in opposite directions, and the first freeform-curved surface lens and the second freeform-curved surface lens are moved in the Y-axis direction in association with movement of some of lens groups constituting the first lens unit and the third lens unit when positional states of the lenses are changed from a wide-angle end state in which a focal distance is shortest to a telephoto end state in which a focal distance is longest.

Thereby, a combined refractive power of the second lens unit changes due to the first freeform-curved surface lens and the second freeform-curved surface lens moving in opposite directions, and aberrations caused by asymmetrical shapes cancel each other out between the two lenses, that is, the first freeform-curved surface lens and the second freeform-curved surface lens due to the first freeform-curved surface lens and the second freeform-curved surface lens moved in opposite direction by the same amount.

Secondly, in the above-described variable focal distance lens system, it is preferable that the following Conditional Expression (1) be satisfied.

$$0.03 < \Delta P2/Z < 0.35 \quad (1)$$

Here, $\Delta P2: \varphi 2T/\varphi 2W$ $\varphi 2T$: A refractive power of the second lens unit in a telephoto end state $\varphi 2W$: A refractive power of the second lens unit in a wide-angle end state $Z: ft/fw$ ft: A focal distance of the entire lens system in a telephoto end state fw: A focal distance of the entire lens system in a wide-angle end state Thereby, chromatic aberration occurring in a telephoto end state is suppressed.

Thirdly, in the above-described variable focal distance lens system, it is preferable that the following Conditional Expression (2) and Conditional Expression (3) be satisfied.

$$0.1 < |\Delta LA|/ft < 0.3 \quad (2)$$

$$0.1 < |\Delta LB|/ft < 0.3 \quad (3)$$

Here, $\Delta LA$: The amount of movement of the first freeform-curved surface lens in the Y-axis direction from a wide-angle end state to a telephoto end state $\Delta LB$: The amount of movement of the second freeform-curved surface lens in the Y-axis direction from a wide-angle end state to a telephoto end state Thereby, a movement space which is large in the Y-axis direction is not required, and the occurrence of asymmetric aberration is suppressed.

Fourthly, in the above-described variable focal distance lens system, it is preferable that an aperture diaphragm be disposed in a vicinity of the second lens unit, and the following Conditional Expression (4) be satisfied.

$$|\Delta P|/fw < 0.7 \quad (4)$$

Here, $\Delta P$: A maximum value of a length along the Z-axis from the aperture diaphragm to the second lens unit fw: A focal distance of the entire lens system in a wide-angle end state Thereby, an off-axis luminous flux passes through a position close to the optical axis.

Fifthly, in the above-described variable focal distance lens system, it is preferable that the following Conditional Expression (5) be satisfied.

$$0.9 < |\Delta LA|/|\Delta LB| < 1.1 \quad (5)$$

Here, $\Delta LA$: The amount of movement of the first freeform-curved surface lens in the Y-axis direction from a wide-angle end state to a telephoto end state $\Delta LB$: The amount of movement of the second freeform-curved surface lens in the Y-axis direction from a wide-angle end state to a telephoto end state Thereby, the amount of movement of the two freeform-curved surface lenses is reduced.

Sixthly, in the above-described variable focal distance lens system, it is preferable that the first lens unit include a first lens group having a positive refractive power and a second lens group having a negative refractive power in this order from an object side to an image side, and at least the second lens group be moved in an optical axis direction so that an interval between the first lens group and the second lens group is increased and an interval between the second lens group and the second lens unit is decreased when positional states of the lenses change from a wide-angle end state to a telephoto end state.

Thereby, a variable power action of the first lens unit is increased, and change in the diameter of the aperture diaphragm accompanying a change in a zooming position is suppressed.

Seventhly, in the above-described variable focal distance lens system, it is preferable that the third lens unit include a focusing lens moving in an optical axis direction in accordance with a subject distance.

Thereby, in a case where a lens group of one of the first lens unit and the second lens unit has a focusing action, it is possible to prevent an angle of view from changing in association with a change in a subject distance.

Eighthly, an imaging device according to the present technology includes a variable focal distance lens system and an imaging element that converts an optical image formed by the variable focal distance lens system into an electrical signal, in which the variable focal distance lens system includes a first lens unit constituted by at least one lens group, a second lens unit constituted by a first freeform-curved surface lens and a second freeform-curved surface lens, and a third lens unit constituted by at least one lens group, the variable focal distance lens system including the first to third lens units in this order from an object side to an image side, the first lens unit and the third lens unit are constituted by a lens having a shape rotationally symmetrical with respect to an optical axis and are disposed on the same optical axis, the first freeform-curved surface lens and the second freeform-curved surface lens are formed to have the same shape and are disposed to be rotated at 180 degrees about an optical axis, the first freeform-curved surface lens and the second freeform-curved surface lens are movable in a Y-axis direction when optical axes of the first lens unit and the third lens unit are set to be a Z-axis, an axis perpendicular to the Z-axis on an image surface is set to be a Y-axis, and an axis perpendicular to the Y-axis and the Z-axis on the image surface is set to be an X-axis, a refractive power of the second lens unit is variable due to the first freeform-curved surface lens and the second freeform-curved surface lens moving in opposite directions, and the first freeform-curved surface lens and the second freeform-curved surface lens are moved in the Y-axis direction in association with movement of some of lens groups constituting the first lens unit and the third lens unit when positional states of the lenses are changed from a wide-angle end state in which a focal distance is shortest to a telephoto end state in which a focal distance is longest.

Thereby, in the variable focal distance lens system, a combined refractive power of the second lens unit changes due to the first freeform-curved surface lens and the second freeform-curved surface lens moving in opposite directions, and when the first freeform-curved surface lens and the second freeform-curved surface lens are moved in opposite direction by the same amount, aberrations caused by asymmetrical shapes cancel each other out between the two lenses, that is, the first freeform-curved surface lens and the second freeform-curved surface lens.

DESCRIPTION OF EMBODIMENTS

Figure 1:
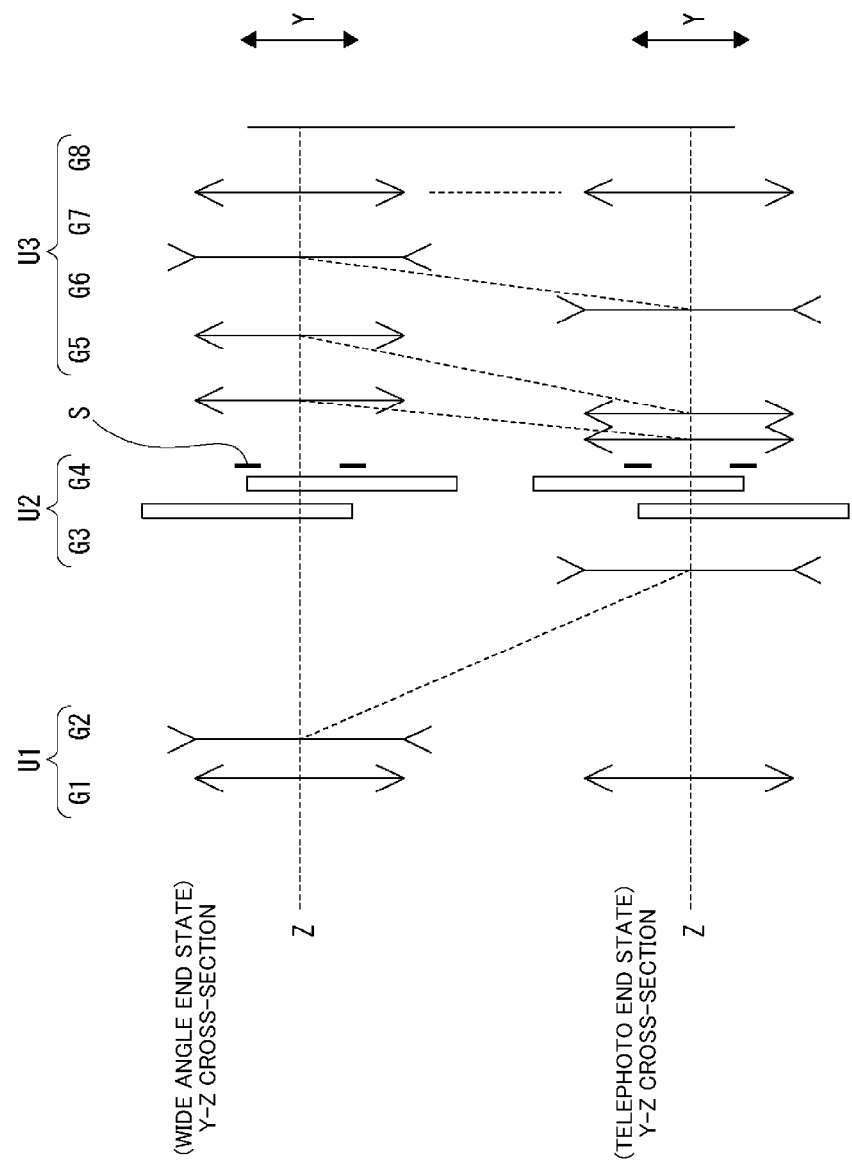
FIG. 1 shows a variable focal distance lens system and an imaging device according to an embodiment of the present technology together with FIGS. 2 to 17, and this diagram shows the arrangement of refractive powers of the variable focal distance lens system.

Hereinafter, a mode for carrying out a variable focal distance lens system and an imaging device of the present technology will be described.
[Configuration of Variable Focal Distance Lens System]

The variable focal distance lens system of the present technology includes a first lens unit constituted by at least one lens group, a second lens unit constituted by a first freeform-curved surface lens and a second freeform-curved surface lens, and a third lens unit constituted by at least one lens group in this order from an object side to an image side.

Further, in the variable focal distance lens system of the present technology system, the first lens unit and the third lens unit are constituted by lenses which are rotationally symmetrical with respect to an optical axis and are disposed on the same optical axis, and the first freeform-curved surface lens and the second freeform-curved surface lens have the same shape and are disposed to be rotated at 180 degrees with respect to the optical axis.

Further, in the variable focal distance lens system of the present technology system, when the optical axes of the first lens unit and the third lens unit are set to be a Z-axis, an axis perpendicular to the Z-axis on an image surface is set to be a Y-axis, and an axis perpendicular to the Y-axis and the Z-axis on the image surface is set to be an X-axis, the first freeform-curved surface lens and the second freeform-curved surface lens are movable in the Y-axis direction.

Additionally, in the variable focal distance lens system of the present technology system, a refractive power of the second lens unit is variable due to the first freeform-curved surface lens and the second freeform-curved surface lens moving in opposite directions, and the first freeform-curved surface lens and the second freeform-curved surface lens are moved in the Y-axis direction in association with the movement of some of lens groups constituting the first lens unit and the third lens unit when positional states of the lenses are changed from a wide-angle end state in which a focal distance is shortest to a telephoto end state in which a focal distance is longest.

In a general zoom lens, a lens having a rotationally symmetrical shape such as a spherical lens or an aspherical lens is used, and the zoom lens is configured such that at least two variable lens groups are moved in an optical axis direction.

Specifically, one variable lens group is moved, and the other lens group is moved to compensate for a change in the position of an image surface accompanying the movement of the variable lens group.

On the other hand, in a variable focal distance lens system disclosed in JP 2007-4063 A or the like, four freeform-curved surface lenses are disposed, and all of the freeform-curved surface lenses are movable in a direction perpendicular to an optical axis. In addition, a refractive power of the entire lens system is changed due to two freeform-curved surface lenses disposed on an object side and moving in opposite directions, and a change in the position of an image surface due to the change in the refractive power is compensated by two freeform-curved surface lenses disposed on an image side and moving in opposite directions.

Here, in the present technology, a rotationally asymmetric lens is used, and thus XYZ axes are defined. When optical axes of the first lens unit and the third lens unit constituted by a lens having a rotationally symmetrical shape are set to be a Z-axis, a surface perpendicular to the Z-axis on an image surface is set to be a Y-axis, and an axis perpendicular to the Z-axis and the Y-axis on the image surface is set to be an X-axis, three axes intersect at the origin on the image surface.

In the variable focal distance lens system of the present technology system, the first freeform-curved surface lens and the second freeform-curved surface lens have the same shape and are disposed to be rotated at 180 degrees with respect to the Z-axis. In addition, a combined refractive power of the second lens unit changes due to the first freeform-curved surface lens and the second freeform-curved surface lens moving in opposite directions. By combining this with a general zoom lens, the overall optical length is shortened while keeping the position of the image surface constant.

In a zoom lens of the related art, a moving direction of each lens group is only an optical axis direction. On the other hand, in the variable focal distance lens system of the present technology, the degree of freedom when changing a focal distance is increased by moving two freeform-curved surface lenses in a direction other than an optical axis direction.

In particular, the first freeform-curved surface lens and the second freeform-curved surface lens are formed to have the same shape to smoothen freeform-curved surface shapes, and it is possible to prevent the degradation of performance due to a deviation in a stop position and eccentricity of the freeform-curved surfaces (tilt or movement of the lens surfaces on the object side and the image side).

In addition, when a focal distance is changed, the first freeform-curved surface lens and the second freeform-curved surface lens are moved in opposite direction by the same amount, so that aberration caused by an asymmetrical shape is canceled by the two lenses, that is, the first freeform-curved surface lens and the second freeform-curved surface lens, thereby realizing good optical performance.

As described above, according to the variable focal distance lens system of the present technology system, it is possible to provide a small and high-magnification variable focal distance lens system exhibiting various effects.

In the variable focal distance lens system of the present technology system, a variable power action for changing a focal distance is generated by a combination of a zoom lens of the related art and movement of a freeform-curved surface lens.

In this case, when a refractive power of the freeform-curved surface lens greatly changes in accordance with the amount of movement, an effect of changing a focal distance is increased. However, since it is difficult to suppress the occurrence of chromatic aberration, predetermined optical performance cannot be obtained.

Consequently, in the variable focal distance lens system of the present technology system, it is preferable that the following Conditional Expression (1) be satisfied.

$$0.03 < \Delta P2/Z < 0.35 \quad (1)$$

Here, $\Delta P2$: $\varphi 2T/\varphi 2W$ $\varphi 2T$: A refractive power of the second lens unit in a telephoto end state $\varphi 2W$: A refractive power of the second lens unit in a wide-angle end state Z: ft/fw ft: A focal distance of the entire lens system in a telephoto end state fw: A focal distance of the entire lens system in a wide-angle end state.

Conditional Expression (1) is a conditional expression for defining a ratio of the second lens unit to a zoom ratio of the entire lens system.

In a case where a value exceeds an upper limit value of Conditional Expression (1), chromatic aberration occurring in a telephoto end state is increased, thereby degrading optical performance.

In contrast, in a case where a value falls below a lower limit value of Conditional Expression (1), it is not possible to sufficiently achieve a reduction in size from a zoom lens of the related art.

Thus, when the variable focal distance lens system satisfies Conditional Expression (1), it is possible to achieve an improvement in optical performance and a reduction in size by suppressing the occurrence of chromatic aberration in a telephoto end state.

Furthermore, it is preferable that an upper limit value of Conditional Expression (1) be set to 0.3 in order to realize a further increase in performance in the present technology.

Further, in the present technology, it is possible to achieve a balance between a reduction in size and an increase in performance by satisfying the following Conditional Expression (2) and Conditional Expression (3).

$$0.1 < |\Delta LA|/ft < 0.3 \quad (2)$$

$$0.1 < |\Delta LB|/ft < 0.3 \quad (3)$$

Here, $\Delta LA$: The amount of movement of the first freeform-curved surface lens in the Y-axis direction from a wide-angle end state to a telephoto end state $\Delta LB$: The amount of movement of the second freeform-curved surface lens in the Y-axis direction from a wide-angle end state to a telephoto end state ft: A focal distance of the entire lens system in a telephoto end state Conditional Expression (2) and Conditional Expression (3) are conditional expressions for defining the amount of movement of the first freeform-curved surface lens and the second freeform-curved surface lens. Here, ft included in each of Conditional Expression (2) and Conditional Expression (3) means fw·Z when a focal distance of the entire lens system in a wide-angle end state is set to be fw, and a variable power ratio of the entire lens system in a telephoto end state and a wide-angle end state are set to be Z. In addition, fw is included in the sense of normalizing (making dimensionless) the conditional expression with a focal distance in a reference wide-angle end state, and consequently, Conditional Expression (2) and Conditional Expression (3) optimize the amounts of movement of the first freeform-curved surface lens and the second freeform-curved surface lens with respect to a variable power ratio.

In a case where a value exceeds upper limit values of Conditional Expression (2) and Conditional Expression (3), a large movement space in the Y-axis direction is required, thereby increasing the size of a lens barrel.

In a case where a value falls below lower limit values of Conditional Expression (2) and Conditional Expression (3), a shape changes greatly with a small amount of movement, and thus asymmetric aberration occurs greatly.

Thus, when the variable focal distance lens system satisfies Conditional Expression (2) and Conditional Expression (3), it is possible to reduce the size of a lens barrel by reducing movement spaces of the first freeform-curved surface lens and the second freeform-curved surface lens in the Y-axis direction and suppress the occurrence of asymmetric aberration accompanying the movement of the first freeform-curved surface lens and the second freeform-curved surface lens.

In the present technology, in order to achieve a further increase in performance, it is preferable that an aperture diaphragm be disposed in the vicinity of the second lens unit, and the following Conditional Expression (4) be satisfied.

$$|\Delta P|/fw < 0.7 \quad (4)$$

Here, $\Delta P$: A maximum value of a length along the Z-axis from the aperture diaphragm to the second lens unit fw: A focal distance of the entire lens system in a wide-angle end state.

Since the first freeform-curved surface lens and the second freeform-curved surface lens differ in a distance from the aperture diaphragm, asymmetrical off-axis aberration occurs easily. Thus, when the first freeform-curved surface lens and the second freeform-curved surface lens are disposed in the vicinity of the aperture diaphragm, an off-axis luminous flux passes through a position close to an optical axis, and thus it is possible to reduce asymmetrical off-axis aberration.

In particular, it is possible to achieve an increase in performance by disposing the second lens unit and the aperture diaphragm to satisfy Conditional Expression (4).

Furthermore, in the present technology, in a case where the size of the freeform-curved surface lens is reduced and the size of the entire lens system is reduced, it is preferable that an upper limit value of Conditional Expression (4) be set to 0.6.

In the present technology, it is preferable to satisfy the following Conditional Expression (5) in order to obtain excellent optical performance even during manufacture by alleviating the accuracy of stop positions of the two freeform-curved surface lenses.

$$0.9 < |\Delta LA|/|\Delta LB| < 1.1 \quad (5)$$

Here, $\Delta LA$: The amount of movement of the first freeform-curved surface lens in the Y-axis direction from a wide-angle end state to a telephoto end state $\Delta LB$: The amount of movement of the second freeform-curved surface lens in the Y-axis direction from a wide-angle end state to a telephoto end state.

In the present technology, since the two freeform-curved surface lenses have the same shape, an action in one lens surface is different when the amount of movement $|\Delta LA|$ and the amount of movement $|\Delta LB|$ differ greatly.

Thus, when the variable focal distance lens system satisfies Conditional Expression (5), the amounts of movement of the two freeform-curved surface lenses are reduced, and thus it is possible to achieve an improvement in optical performance.

In addition, it is preferable to set an upper limit value of Conditional Expression (5) to 1.05 and set a lower limit value thereof to 0.95 in order to realize a further increase in optical performance.

In the present technology, in order to achieve a further increase in performance, it is preferable that the first lens unit include a first lens group having a positive refractive power and a second lens group having a negative refractive power in this order from an object side to an image side, and at least the second lens group be moved in an optical axis direction so that an interval between the first lens group and the second lens group is increased and an interval between the second lens group and the second lens unit is decreased when the positional states of the lenses change from a wide-angle end state to a telephoto end state.

With such a configuration, a variable power action of the first lens unit is increased, and change in the diameter of the aperture diaphragm accompanying a change in a zooming position is suppressed. As a result, it is possible to obtain a stable optical quality even in mass production by equalizing the surface accuracies of the freeform-curved surface lenses required in a wide-angle end state and a telephoto end state.

In the present technology, it is preferable that the third lens unit include a focusing lens moving in an optical axis direction in accordance with a subject distance.

This is because the first lens unit and the second lens unit have a variable power action, so when a lens group of one of the lens units has a focusing action, a focal distance of the entire lens system changes, and an angle of view changes with a change in a subject distance.

Thus, when the third lens unit includes a focusing lens, it is possible to achieve an improvement in optical performance by preventing the occurrence of a change in an angle of view accompanying a change in a subject distance in a case where a lens group of one of the first lens unit and the second lens unit has a focusing action.

Furthermore, in each example according to the present technology, an aperture diaphragm is disposed on an image side of the second lens unit, but the aperture diaphragm can also be disposed on an object side of the second lens unit or between two freeform-curved surface lenses constituting the second lens unit.

In the variable focal distance of the present technology, the shape of a freeform-curved surface is expressed by an XY polynomial expression. In an expression showing a specific shape, when k is set to be a conic coefficient (conic constant), and C3, C4, . . . , and C53 are set to be coefficients, a sag amount Zsag in the Z-axis direction is represented by the following Expression 1.

$$Zsag = C_3 Y + C_4 X^2 + C_6 Y^2 + C_8 X^2 Y + \qquad [\text{Math. 1}]$$
$$C_{10} Y^3 + C_{19} X^2 Y^3 + C_{21} Y^5 + C_{11} X^4 + C_{15} Y^4 +$$
$$C_{17} X^4 Y + C_{24} X^4 Y^2 + C_{32} X^4 Y^2 + C_{34} X^2 Y^5 +$$
$$C_{22} X^6 + C_{36} Y^7 + C_{30} X^6 Y + C_{51} X^4 Y^5 + C_{53} X^2 Y^7$$

In the present technology, the first freeform-curved surface lens and the second freeform-curved surface lens are moved in the Y-axis direction, and thus the first freeform-curved surface lens and the second freeform-curved surface lens have shapes symmetrical to a Y-Z plane. Specifically, this means that an odd-order term of X is zero.

In addition, the first freeform-curved surface lens and the second freeform-curved surface lens are disposed in opposite directions with respect to the Z-axis, and thus the signs of a term in which Y is an odd order are reversed in an XY polynomial expression.

Furthermore, in the present technology, it is also possible to dispose a low-pass filter on an image side of the lens system in order to prevent the occurrence of moire fringes or dispose an infrared cut filter according to spectral sensitivity characteristics of a light receiving element.

[Numerical Example of Variable Focal Distance Lens System]

Hereinafter, a specific embodiment of the variable focal distance lens system of the present technology system and a numerical example in which specific numerical values are applied to the embodiment will be described with reference to the drawings and tables.

FIG. 1 shows the arrangement of refractive powers of the variable focal distance lens system according to each example of the present technology. In the variable focal distance lens system of the present technology system, a first lens unit U1, a second lens unit U2, and a third lens unit U3 are disposed in this order from an object side to an image side.

The first lens unit U1 includes a first lens group G1 having a positive refractive power and a second lens group G2 having a negative refractive power. The second lens unit U2 includes a third lens group G3 and a fourth lens group G4 constituted by a freeform-curved surface lens. The third lens unit U3 includes a fifth lens group G5, a sixth lens group G6, a seventh lens group G7, and an eighth lens group G8.

When a focal distance state changes from a wide-angle end state in which a focal distance is shortest to a telephoto end state in which a focal distance is longest, the first lens group G1 is fixed, the second lens group G2 is moved to the image side along a Z-axis, the third lens group G3 is moved in a negative direction in a Y-axis direction, the fourth lens group G4 is moved in a positive direction in the Y-axis direction, the fifth lens group G5 is moved to an object side along the Z-axis, the sixth lens group G6 is moved to the object side along the Z-axis, the seventh lens group G7 is moved to the object side along the Z-axis, and the eighth lens group G8 is fixed.

In addition, an air gap D1 between the first lens group G1 and the second lens group G2 is increased, an air gap D2 between the second lens group G2 and the third lens group G3 is decreased, an air gap D4 between the fourth lens group G4 and the fifth lens group G5 is decreased, an air gap D5 between the fifth lens group G5 and the sixth lens group G6 changes, an air gap D6 between the sixth lens group G6 and the seventh lens group G7 changes, and an air gap D7 between the seventh lens group G7 and the eighth lens group G8 is increased.

An aperture diaphragm S is disposed on an image side of the fourth lens group G4 and is fixed in an optical axis direction when a focal distance changes.

In each example of the present technology, an IR cut filter, a low-pass filter, and a cover glass of an image sensor are disposed on an image side of the eighth lens group G8.

In each example, an aspherical surface is represented by the following expression.

$$z = cH^2/[1+[1-(1+k)c^2H^2]^{1/2}]+AH^4+BH^6+ \ldots \; (H^2 = (x^2+y^2)^{1/2})$$

Furthermore, H is a distance from an optical axis, z is a sag amount, c is a curvature, k is a conic coefficient (conic constant), and A, B, . . . are aspherical coefficients.

First Example

Figure 2:
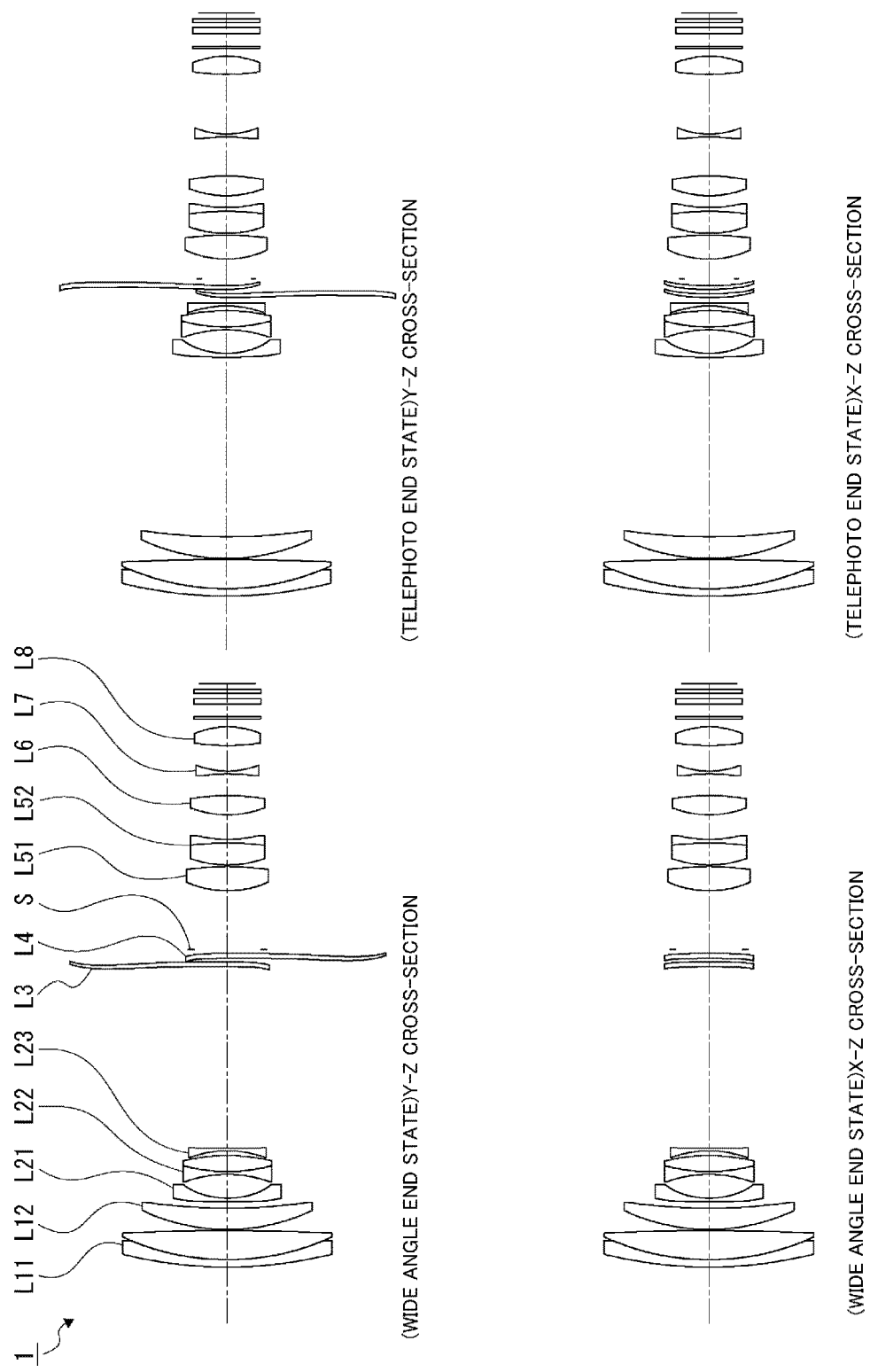
FIG. 2 is a diagram showing a lens configuration of a first example.

FIG. 2 is a cross-sectional view of a lens of a variable focal distance lens system 1 according to a first example of the present technology.

A first lens group G1 includes a cemented lens L11 of a negative lens having a meniscus shape with a concave surface facing an image side and a positive lens with a convex surface facing an object side, and a positive lens L12 having a meniscus shape with a convex surface facing the object side.

A second lens group G2 includes a negative lens L21 having a meniscus shape with a concave surface facing an object side, a cemented lens L22 with a biconcave lens and a biconvex lens, and a negative lens L23 with a concave surface facing the object side.

A third lens group G3 includes one first freeform-curved surface lens L3, a fourth lens group G4 includes one second freeform-curved surface lens L4, and the first freeform-curved surface lens L3 and the second freeform-curved surface lens L4 are disposed to be reversed with respect to the Z-axis.

A fifth lens group G5 includes a biconvex positive lens L51 and a cemented lens L52 with a positive lens with a convex surface facing an object side and a negative lens with a concave surface facing an image side.

A sixth lens group G6 includes a biconvex positive lens L6.

A seventh lens group G7 includes a negative lens L7 with a concave surface facing an image side.

An eighth lens group G8 includes a positive lens L8 with a convex surface facing an object side.

Furthermore, in the first example, the amounts of movement of the first freeform-curved surface lens L3 and the second freeform-curved surface lens L4 in the Y-axis direction are slightly different from each other. Thereby, it is possible to reduce the size of the variable focal distance lens system 1 in the Y-axis direction.

Various values in the first example of the present technology are shown in the following Tables 1 to 4. Table 1 shows lens data such as a radius of curvature of each lens, Table 2 shows variable intervals and the amounts of movement (zoom displacement amounts) at the time of changing a focal distance, Table 3 shows XY freeform-curved surface coefficients (XY polynomial expression coefficients) representing the shapes of freeform-curved surface lenses, and Table 4 shows aspherical coefficients.

Furthermore, meanings of signs shown in the following tables and description, and the like are as described below.

In Table 1, "Radius of curvature" indicates a reciprocal number of a curvature, "0" in the "Radius of curvature" indicates a flat surface, "Dn" indicates an axial surface distance (the thickness of the center of a lens or an air gap) which is a variable interval between an n-th surface and an n+1-th surface, and "Refractive index" and "Abbe number" indicate a refractive index and an Abbe number in a d line ($\lambda$=587.6 nm). In Table 2, "x" and "y" indicate values in the X-axis direction and the Y-axis direction, and "Y shift amount" indicates the amounts of movement of the first freeform-curved surface lens L3 and the second freeform-curved surface lens L4 in the Y-axis direction.

TABLE 1

| Surface Number | Shape | Radius of curvature | Interval | Refractive index | Abbe number |
|---|---|---|---|---|---|
| 1 | Spherical surface | 58.1002 | 1.0000 | 1.92286 | 20.88 |
| 2 | Spherical surface | 33.8463 | 3.9600 | 1.55032 | 75.50 |
| 3 | Spherical surface | −307.5720 | 0.1500 | | |
| 4 | Spherical surface | 26.9294 | 2.9240 | 1.77250 | 49.62 |
| 5 | Spherical surface | 75.7822 | (D1) | | |
| 6 | Aspherical surface | 143.4149 | 0.5000 | 1.88202 | 37.22 |
| 7 | Aspherical surface | 11.9031 | 3.2000 | | |
| 8 | Spherical surface | −16.9141 | 0.4000 | 1.83481 | 42.72 |
| 9 | Spherical surface | 22.3735 | 2.1928 | 1.94595 | 17.98 |
| 10 | Spherical surface | −25.1716 | 0.6325 | | |
| 11 | Spherical surface | −14.7962 | 0.4000 | 1.83481 | 42.72 |
| 12 | Spherical surface | 500.0000 | (D2) | | |
| 13 | Freedom-curved surface | −38.7861 | 0.6400 | 1.5247 | 56.236 |
| 14 | Freedom-curved surface | −35.9330 | 0.5000 | | |
| 15 | Freedom-curved surface | −38.7861 | 0.6400 | 1.5247 | 56.236 |

TABLE 1-continued

| Surface Number | Shape | Radius of curvature | Interval | Refractive index | Abbe number |
|---|---|---|---|---|---|
| 16 | Freedom-curved surface | −35.9330 | 0.5500 | | |
| 17 | Flat surface | 0 | (D3) | | |
| 18 | Aspherical surface | 13.4093 | 3.2881 | 1.59201 | 67.02 |
| 19 | Aspherical surface | −35.3650 | 0.2000 | | |
| 20 | Spherical surface | 14.4408 | 3.0133 | 1.55032 | 75.50 |
| 21 | Spherical surface | −38.6635 | 0.5000 | 1.88100 | 40.14 |
| 22 | Spherical surface | 18.0000 | (D4) | | |
| 23 | Aspherical surface | 13.1771 | 2.6685 | 1.49710 | 81.56 |
| 24 | Aspherical surface | −22.9941 | (D5) | | |
| 25 | Aspherical surface | −30.1414 | 0.4000 | 1.80420 | 46.50 |
| 26 | Aspherical surface | 10.7600 | (D6) | | |
| 27 | Aspherical surface | 30.0000 | 2.5140 | 1.55332 | 61.68 |
| 28 | Aspherical surface | −10.0172 | 1.0500 | | |
| 29 | Flat surface | 0 | 0.3000 | 1.51680 | 64.20 |
| 30 | Flat surface | 0 | 1.7500 | | |
| 31 | Flat surface | 0 | 0.7500 | 1.51680 | 64.20 |
| 32 | Flat surface | 0 | 0.7000 | | |
| 33 | Flat surface | 0 | 0.5000 | 1.51680 | 64.20 |
| 34 | Flat surface | 0 | 0.8000 | | |

TABLE 2

| Amount of zooming | | Wide angle end state | Intermediate focal distance | Telephoto end state |
|---|---|---|---|---|
| Focal distance | x | 4.6320 | 19.6124 | 82.9637 |
| | y | 4.6321 | 19.6052 | 82.9637 |
| F number | x | 2.0599 | 3.7155 | 3.9110 |
| | y | 2.0599 | 3.7166 | 3.9104 |
| Object distance | | Infinity | Infinity | Infinity |
| Interval | D5 | 0.8456 | 14.7589 | 24.5006 |
| Interval | D12 | 24.6551 | 10.7418 | 1.0000 |
| Y shift amount | 13 surfaces 14 surfaces | 7.1975 | −3.9888 | −10.0000 |
| Y shift amount | 15 surfaces 16 surfaces | −7.2345 | 3.7070 | 9.6568 |
| Interval | D17 | 8.0427 | 2.7150 | 2.7000 |
| Diaphragm diameter | | 4.4522 | 3.3734 | 3.3475 |
| Interval D4 | D22 | 3.3173 | 3.1713 | 1.6301 |
| Interval D5 | D24 | 2.9113 | 5.8198 | 5.2937 |
| Interval | D26 | 3.5125 | 6.0776 | 8.1599 |
| Interval when object distance is 800 mm | D24 | 2.9237 | 6.0094 | 8.0652 |
| Interval when object distance is 800 mm | D26 | 3.5000 | 5.8880 | 5.3884 |

TABLE 3

| Surface number | Coefficient |
|---|---|
| 13 | K: −7.7111E+00 Y: −2.1226E−02 X2:1.0485E−02 Y2: 9.2708E−03 X2Y: 6.8875E−04 Y3: 5.4623E−05 X4: 1.6288E−05 X2Y2: 8.3276E−05 Y4: 2.3319E−05 X4Y: −6.7069E−06 X2Y3: −1.4486E−05 Y5: −6.9778E−07 X6: 4.5851E−07 X4Y2: −1.0631E−06 X2Y4: −1.2193E−07 Y6: −1.3671E−07 X6Y: −2.2949E−07 X4Y3: 7.4053E−07 X2Y5: 2.2902E−07 Y7: 1.0567E−08 X6Y2: 1.8312E−09 X4Y4: −7.7352E−09 X2Y6: −1.7793E−09 Y8: 1.3393E−10 X8Y: 4.8579E−09 X6Y3: 2.6744E−09 X4Y5: −4.5179E−09 X2Y7: −5.4002E−10 |
| 14 | K: 4.6841E−01 Y: −2.7641E−02 X2: 1.0903E−02 Y2: 9.7191E−03 2Y: 6.2737E−04 Y3: 3.7351E−05 X4: 3.5022E−05 X2Y2: 1.2229E−04 Y4: 4.1307E−05 X4Y: −6.3578E−06 X2Y3: −1.3721E−05 Y5: −6.3843E−07 X6: 4.0128E−07 X4Y2: −1.2494E−06 X2Y4: −2.7578E−07 Y6: −1.6392E−07 X6Y: −2.1954E−07 X4Y3: 7.0777E−07 X2Y5: 2.1753E−07 Y7: 1.0068E−08 X6Y2: 2.6030E−09 X4Y4: −5.6672E−09 X2Y6: −1.1519E−09 Y8: 1.9567E−10 X8Y: 5.0369E−09 X6Y3: 2.22536−09 X4Y5: −4.3030E−09 X2Y7: −5.1034E−10 |
| 15 | K: −7.7111E+00 Y: 2.126E−02 X2: 1.0485E−02 Y2: 9.2708E−03 X2Y: −6.8875E−04 Y3: −5.4623E−05 X4: 1.6288E−05 X2Y2: 8.3276E−05 Y4: 2.3319E−05 X4Y: 6.7069E−06 X2Y3: 1.4486E−05 Y5: 6.9778E−07 X6: 4.5851E−07 X4Y2: −1.0631E−06 X2Y4: −1.2193E−07 Y6: −1.3671E−07 X6Y: 2.2949E−07 X4Y3: −7.4053E−07 X2Y5 −2.2902E−07 Y7: −1.0567E−08 X6Y2: 1.8312E−09 X4Y4: −7.7352E−09 X2Y6: −1.7793E−09 Y8: 1.3393E−10 X8Y: −4.8579E−09 X6Y3: −2.6744E−09 X4Y5: 4.5179E−09 X2Y7: 5.4002E−10 |
| 16 | K: 4.6841E−01 Y: 2.7641E−02 X2: 1.0903E−02 Y2: 9.7191E−03 X2Y: −6.2737E−04 Y3: −3.7351E−05 X4: 3.5022E−05 X2Y2: 1.2229E−04 Y4: 4.1307E−05 X4Y: 6.3578E−06 X2Y2: 1.3721E−05 Y5: 6.3843E−07 X6: 4.0128E−07 X4Y2: −1.2494E−06 X2Y4: −2.7578E−07 Y6: −1.6392E−07 X6Y: 2.1954E−07 X4Y3: −7.0777E−07 X2Y5: −2.1753E−07 Y7: −1.0068E−08 X6Y2: 2.6030E−09 X4Y4: −5.6673E−09 X2Y6: −1.1579E−09 Y8: 1.9567E−10 X8Y: −5.0369E−09 X6Y3: −2.2253E−09 X4Y5: 4.3030E−09 X2Y7: 5.1034E−10 |

TABLE 4

| Surface number | A | B | C | D |
|---|---|---|---|---|
| 6 | 0.857815E−04 | 0.837914E−06 | −0.122202E−07 | |
| 7 | 0.830743E−04 | 0.122415E−05 | 0.924242E−07 | −0.709530E−09 |
| 18 | −0.249204E−04 | 0.128444E−05 | −0.130173E−07 | |
| 19 | 0.289971E−04 | 0.193471E−05 | −0.247764E−07 | |
| 23 | −0.117490E−03 | 0.355087E−05 | −0.842477E−07 | |
| 24 | 0.145047E−03 | 0.218327E−05 | −0.429988E−07 | |
| 25 | −0.248457E−03 | 0.816196E−05 | 0.277077E−07 | |
| 26 | −0.290707E−03 | 0.539813E−05 | 0.116561E−06 | |
| 27 | 0.267184E−03 | −0.235796E−04 | 0.660651E−06 | −0.794752E−08 |
| 28 | 0.758550E−03 | −0.272476E−04 | 0.514152E−06 | −0.156939E−08 |

Table 5 shows correspondence values of conditional expressions in the first example.

TABLE 5

|  |  | Example 1 |
| --- | --- | --- |
|  | φ2Wx | 0.00056 |
|  | φ2Wy | 0.00056 |
|  | φ2Tx | 0.00296 |
|  | φ2Ty | 0.00296 |
|  | ftx | 82.964 |
|  | fty | 82.964 |
|  | fwx | 4.632 |
|  | fwy | 4.632 |
| Conditional Expression (1) | Δ P2/Z | 0.295 |
|  | \|ΔLA\| | 17.1975 |
| Conditional Expression (2) | \|ΔLA\|/ft | 0.207 |
|  | \|ΔLB\| | 16.8913 |
| Conditional Expression (3) | \|ΔLB\|/ft | 0.204 |
|  | \|ΔP\| | 2.330 |
| Conditional Expression (4) | \|ΔP\|/fw | 0.503 |
| Conditional Expression (5) | \|ΔLA\|/\|ΔLB\| | 1.018 |

Figure 3:
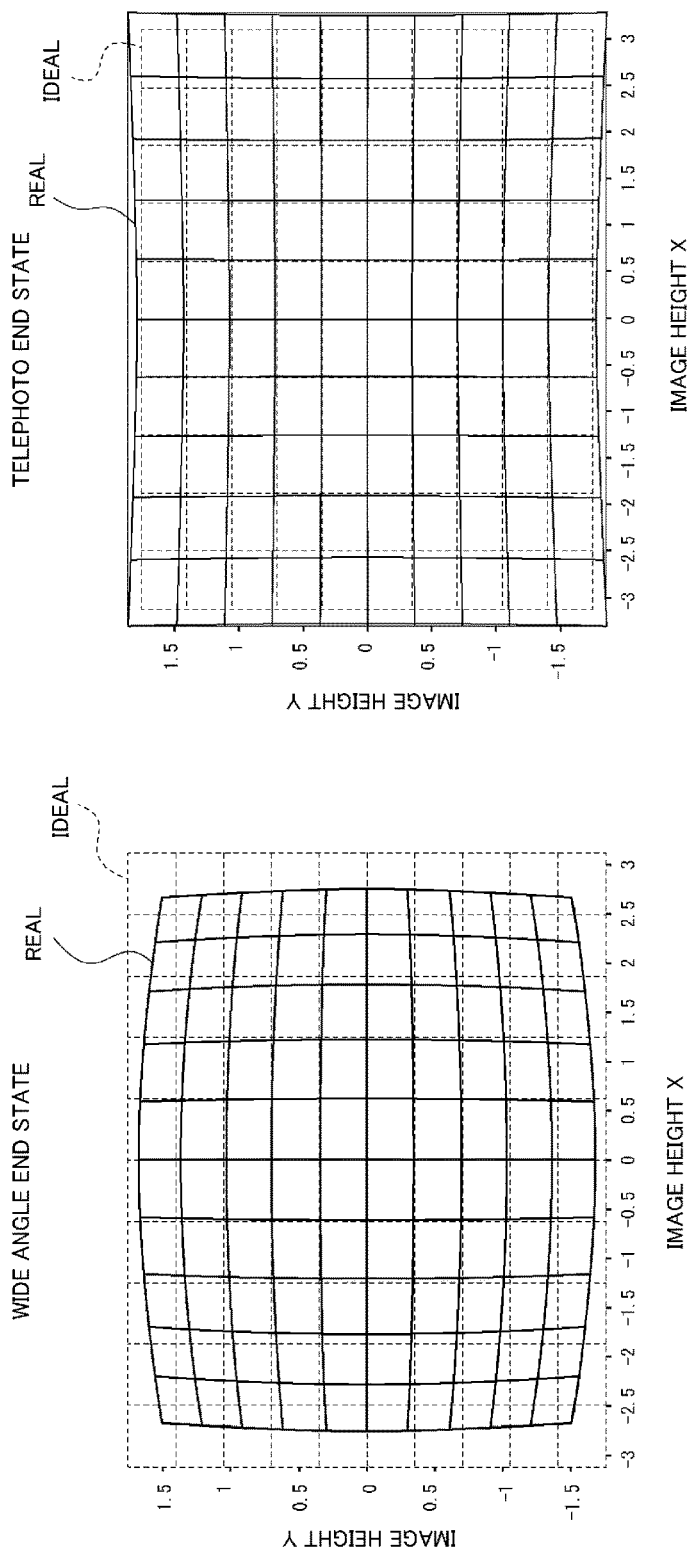
FIG. 3 is a spot diaphragm of the first example.
Figure 4:
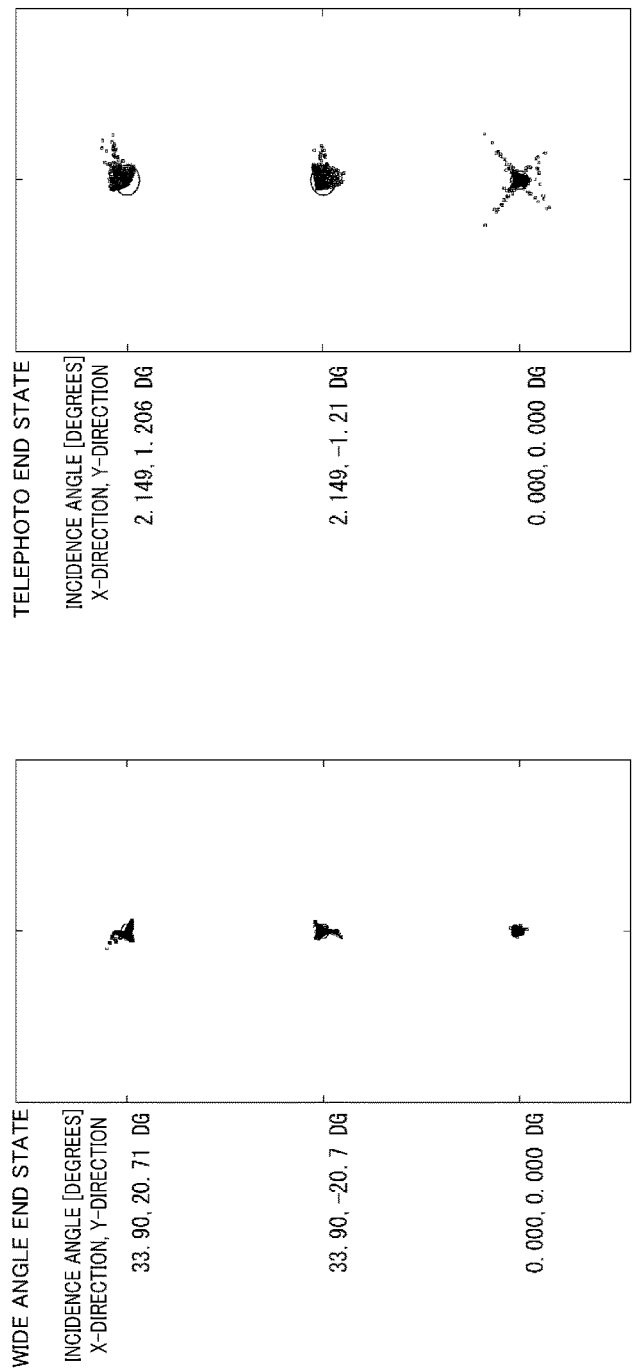
FIG. 4 is a diagram showing distortion aberration of the first example.

FIG. 3 shows spot diaphragms in a wide-angle end state and a telephoto end state in the first example, and FIG. 4 shows distortion aberration diagrams in the first example.

From the aberration diagrams, it is apparent that various aberrations are satisfactorily corrected and image forming performance is excellent in the present example.

Second Example

Figure 5:
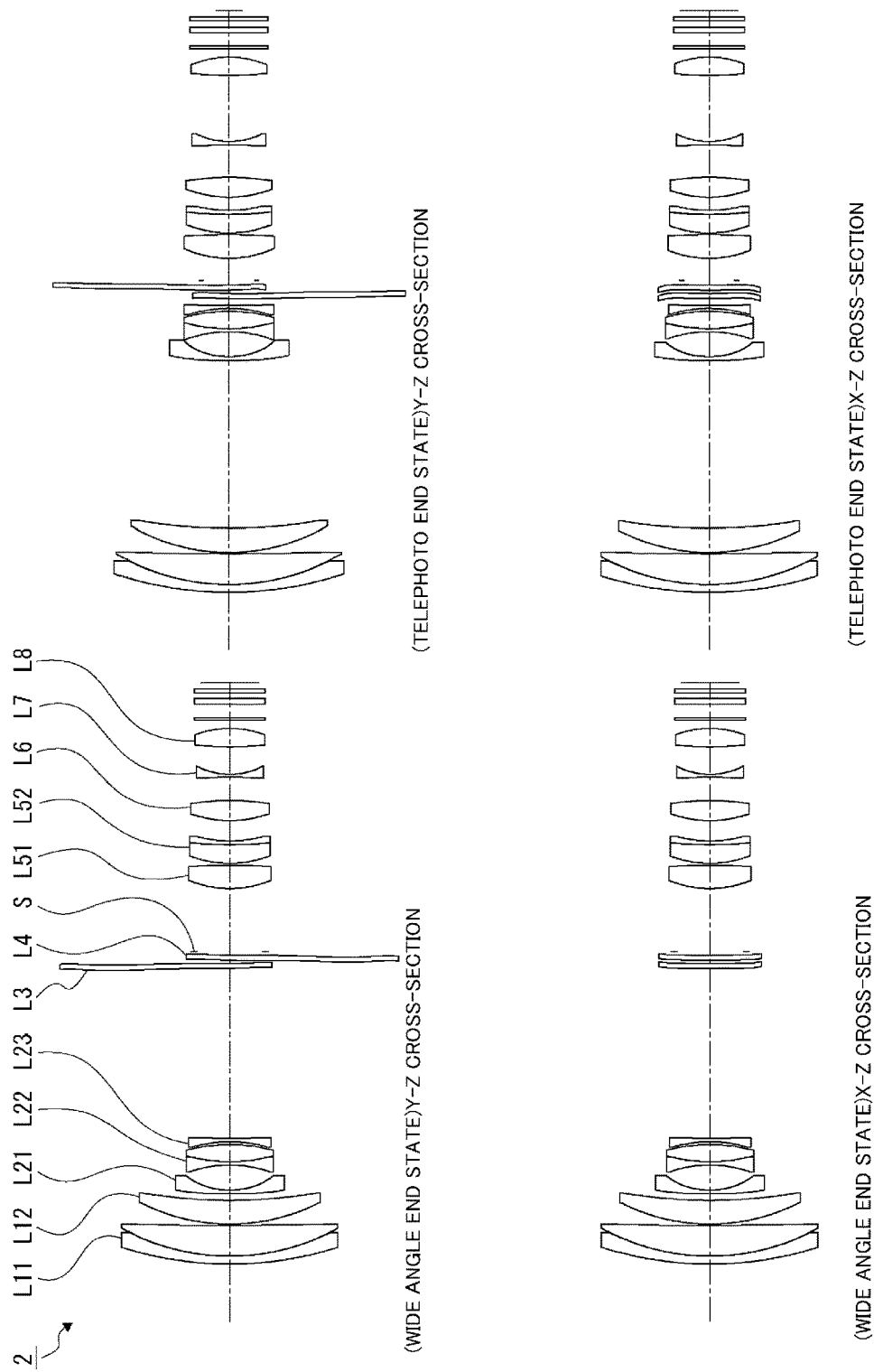
FIG. 5 is a diagram showing a lens configuration of a second example.

FIG. 5 shows a cross-sectional view of a lens of a variable focal distance lens system 2 according to a second example of the present technology.

The first lens group G1 includes a cemented lens L11 of a negative lens having a meniscus shape with a concave surface facing an image side and a positive lens with a convex surface facing an object side, and a positive lens L12 having a meniscus shape with a convex surface facing the object side.

A second lens group G2 includes a negative lens L21 having a meniscus shape with a convex surface facing an object side, a cemented lens L22 of a biconcave lens and a biconvex lens, and a negative lens L23 with a concave surface facing the object side.

A third lens group G3 includes one first freeform-curved surface lens L3, a fourth lens group G4 includes one second freeform-curved surface lens L4, and the first freeform-curved surface lens L3 and the second freeform-curved surface lens L4 are disposed to be reversed with respect to the Z-axis.

A fifth lens group G5 includes a biconvex positive lens L51 and a cemented lens L52 of a positive lens with a convex surface facing an object side and a negative lens with a concave surface facing an image side.

A sixth lens group G6 includes a biconvex positive lens L6.

A seventh lens group G7 includes a negative lens L7 with a concave surface facing an image side.

An eighth lens group G8 includes a positive lens L8 with a convex surface facing an object side.

Furthermore, in the second example, the amounts of movement of the first freeform-curved surface lens L3 and the second freeform-curved surface lens L4 in the Y-axis direction are slightly different from each other. Thereby, it is possible to reduce the size of the variable focal distance lens system 2 in the Y-axis direction.

Various values in the second example of the present technology are shown in the following Tables 6 to 9. Table 6 shows lens data such as a radius of curvature of each lens, Table 7 shows variable intervals and the amounts of movement (zoom displacement amounts) at the time of changing a focal distance, Table 8 shows XY freeform-curved surface coefficients (XY polynomial expression coefficients) representing the shapes of freeform-curved surface lenses, and Table 9 shows aspherical coefficients.

Furthermore, meanings of signs shown in the following tables and description, and the like are as described below.

In Table 6, "Radius of curvature" indicates a reciprocal number of a curvature, "0" in the "Radius of curvature" indicates a flat surface, "Dn" indicates an axial surface distance (the thickness of the center of a lens or an air gap) which is a variable interval between an n-th surface and an n+1-th surface, and "Refractive index" and "Abbe number" indicate a refractive index and an Abbe number in a d line (λ=587.6 nm). In Table 7, "x" and "y" indicate values in the X-axis direction and the Y-axis direction, and "Y shift amount" indicates the amounts of movement of the first freeform-curved surface lens L3 and the second freeform-curved surface lens L4 in the Y-axis direction.

TABLE 6

| Surface number | Shape | Radius of curvature | Interval | Refractive index | Abbe number |
| --- | --- | --- | --- | --- | --- |
| 1 | Spherical surface | 45.8928 | 1.0000 | 1.94577 | 18.01 |
| 2 | Spherical surface | 28.1837 | 3.9614 | 1.55903 | 73.64 |
| 3 | Spherical surface | 573.4217 | 0.1500 |  |  |
| 4 | Spherical surface | 25.0000 | 3.0666 | 1.88100 | 40.14 |
| 5 | Spherical surface | 67.1334 | (D5) |  |  |
| 6 | Aspherical surface | 1542.0345 | 0.5000 | 1.88202 | 37.22 |
| 7 | Aspherical surface | 11.8900 | 3.1985 |  |  |
| 8 | Spherical surface | −15.2497 | 0.4000 | 1.88100 | 40.14 |
| 9 | Spherical surface | 21.7204 | 2.1988 | 1.94595 | 17.98 |
| 10 | Spherical surface | −20.7626 | 0.4000 |  |  |
| 11 | Spherical surface | −16.0910 | 0.4000 | 1.88087 | 40.15 |
| 12 | Spherical surface | 150.0000 | (D12) |  |  |
| 13 | Freeform-curved surface | −38.2450 | 0.6400 | 1.63423 | 23.87 |
| 14 | Freeform-curved surface | −43.6888 | 0.4100 |  |  |
| 15 | Freeform-curved surface | −38.2450 | 0.6400 | 1.52470 | 56.236 |
| 16 | Freeform-curved surface | −43.6888 | 0.5500 |  |  |
| 17 | Flat surface | 0 | (D17) |  |  |
| 18 | Aspherical surface | 13.4000 | 3.0380 | 1.61879 | 63.86 |
| 19 | Aspherical surface | −64.1442 | 0.2000 |  |  |

TABLE 6-continued

| Surface number | Shape | Radius of curvature | Interval | Refractive index | Abbe number |
|---|---|---|---|---|---|
| 20 | Spherical surface | 14.0000 | 2.4043 | 1.61579 | 64.41 |
| 21 | Spherical surface | 51.7485 | 0.5000 | 1.93078 | 22.68 |
| 22 | Spherical surface | 16.6000 | (D22) | | |
| 23 | Aspherical surface | 14.0895 | 2.5834 | 1.51738 | 77.45 |
| 24 | Aspherical surface | −24.5082 | (D24) | | |
| 25 | Aspherical surface | −45.1067 | 0.4000 | 1.83066 | 40.80 |
| 26 | Aspherical surface | 9.2600 | (D26) | | |
| 27 | Aspherical surface | 47.9867 | 2.3508 | 1.61881 | 63.86 |
| 28 | Aspherical surface | −10.6736 | 1.0500 | | |
| 29 | Flat surface | 0 | 0.3000 | 1.51680 | 64.20 |
| 30 | Flat surface | 0 | 1.7500 | | |
| 31 | Flat surface | 0 | 0.7500 | 1.51680 | 64.20 |
| 32 | Flat surface | 0 | 0.7000 | | |
| 33 | Flat surface | 0 | 0.5000 | 1.51680 | 64.20 |
| 34 | Flat surface | 0 | 0.8000 | | |

TABLE 7

| Amount of zooming | | Wide angle end state | Intermediate focal distance | Telephoto end state |
|---|---|---|---|---|
| Focal distance | x | 4.6320 | 19.6243 | 83.0361 |
| | y | 4.6320 | 19.6154 | 82.9531 |
| F number | x | 2.0615 | 3.7204 | 3.9147 |
| | y | 2.0615 | 3.7187 | 3.9108 |
| Object distance | | Infinity | Infinity | Infinity |
| Interval | D5 | 0.8456 | 12.8695 | 21.5054 |
| Interval | D12 | 21.6599 | 9.6359 | 1.0000 |
| Y shift amount | 13 surfaces | 7.6169 | 0.1385 | −9.3763 |
| | 14 surfaces | | | |
| Y shift amount | 15 surfaces | −7.4254 | −0.0710 | 9.3562 |
| | 16 surfaces | | | |
| Interval | D17 | 8.0546 | 2.7000 | 2.7000 |
| Diaphragm diameter | | 4.1478 | 3.2612 | 3.1901 |
| Interval D4 | D22 | 2.5980 | 2.5238 | 1.6925 |
| Interval D5 | D24 | 2.8970 | 5.5870 | 4.1503 |
| Interval | D26 | 3.5107 | 6.2495 | 8.5175 |
| Interval when object distance is 800 mm | D24 | 2.9077 | 5.7505 | 6.5184 |
| Interval when object distance is 800 mm | D26 | 3.500 | 6.0862 | 6.1494 |

TABLE 8

| Surface number | Coefficient |
|---|---|
| 13 | K: −9.6964E+00 Y: −1.5755E−02 X2: 9.8874E−03 Y2: 9.3393E−03 X2Y: 2.8927E−04 Y3: −1.0644E−05 X4: 9.2507E−05 X2Y2: 1.7017E−04 Y4: 3.2879E−05 X4Y: 8.7129E−06 X2Y3: −8.4676E−06 Y5: −3.9227E−07 X6: −1.2083E−06 X4Y2: −4.7483E−06 X2Y4: −2.8030E−07 Y6: −8.2982E−08 X6Y: −2.7267E−07 X4Y3: −1.0783E−07 X2Y5: 1.5253E−07 Y7: 1.1277E−08 X6Y2: 3.4760E−08 X4Y4: 1.5293E−09 X2Y6: −5.4032E−09 Y8: −2.3373E−10 X8Y: −1.1343E−08 X6Y3: 6.1491E−09 X4Y5: −1.2596E−09 X2Y7: −7.0213E−10 Y9: −4.1720E−11 |
| 14 | K: −2.0214E+00 Y: −15624E−02 X2: 8.3855E−03 Y2: 7.8790E−03 X2Y: 3.4092E−04 Y3: 1.0962E−05 X4: 1.0596E−04 X2Y2: 1.9924E−04 Y4: 4.8965E−05 X4Y: 6.8877E−06 X2Y3: −9.8044E−06 Y5: −5.6958E−07 X6: −1.2381E−06 X4Y2: −4.8176E−06 X2Y4: −5.0992E−07 Y6: −1.3431E−07 X6Y: −2.4723E−07 X4Y3: −6.5507E−08 X2Y5: 1.5786E−07 Y7: 1.1689E−08 X6Y2: 3.3126E−08 X4Y4: 3.7097E−09 X2Y6: −4.3562E−09 Y8: −1.2212E−10 X8Y: −1.1007E−08 X6Y3: 5.3934E−09 X4Y5: −1.3672E−09 X2Y7: −6.9932E−10 Y9: −4.1736E−11 |
| 15 | K: −9.6964E+00 Y: 1.5755E−02 X2: 9.8574E−03 Y2: 9.3393E−03 X2Y: −2.8927E−04 Y3: 1.0644E−05 X4: 9.2507E−05 X2Y2: 1.7017E−04 Y4: 3.2879E−05 X4Y: −8.7129E−06 X2Y3: 8.4676E−06 Y5: 3.9227E−07 X6: −1.2083E−06 X4Y2: −4.7483E−06 X2Y4: −2.8030E−07 Y6: −8.2982E−08 X6Y: 2.7267E−07 X4Y3: 1.0783E−07 X2Y5: −1.5253E−07 Y7: −1.1277E−08 X6Y2: 3.4760E−08 X4Y4: 1.5293E−08 X2Y6: −5.4032E−09 Y8: −2.3373E−10 X8Y: 1.1343E−08 X6Y3: −6.1491E−09 X4Y5: 1.2596E−09 X2Y7: 7.0213E−10 Y9: 4.1720E−11 |
| 18 | K: −2.0214E+00 Y: 1.5624E−02 X2: 8.3855E−03 Y2: 7.8790E−03 X2Y: −3.4092E−04 Y3: −1.0962E−05 X4: 1.0596E−04 X2Y2 : 1.9924E−04 Y4: 4.8965E−05 X4Y: −6.8877E−06 X2Y3: 9.8044E−06 Y5: 5.6958E−07 X6: −1.2381E−06 X4Y2: −4.8176E−06 X2Y4: −5.0992E−07 Y6: −1.3431E−07 X6Y: 2.4723E−07 X4Y3: 6.5507E−08 X2Y5: −1.5786E−07 Y7: −1.1669E−08 X6Y2: 3.3126E−08 X4Y4: 3.7097E−09 X2Y6: −4.3562E−09 Y8: −1.2212E−10 X8Y: 1.1007E−08 X6Y3: −5.3934E−09 X4Y5: 1.3672E−09 X2Y7: 6.9932E−10 Y9: 4.1736E−11 |

TABLE 9

| Surface number | A | B | C | D |
|---|---|---|---|---|
| 6 | 0.710992E−03 | −0.249156E−04 | 0.435303E−06 | −0.279130E−08 |
| 7 | 0.739912E−03 | −0.128934E−04 | −0.213179E−06 | 0.113485E−07 |
| 18 | −0.365249E−04 | 0.114928E−05 | −0.313616E−07 | |
| 19 | 0.106517E−04 | 0.188755E−05 | −0.489390E−07 | |
| 23 | −0.145339E−03 | 0.347096E−05 | −0.100498E−06 | |
| 24 | 0.140305E−03 | 0.244437E−05 | −0.518938E−07 | |
| 25 | −0.248457E−03 | 0.816196E−05 | 0.277077E−07 | |
| 26 | −0.154273E−03 | 0.670139E−05 | 0.108127E−06 | |
| 27 | 0.279092E−03 | −0.178969E−04 | 0.595191E−06 | −0.104307E−07 |
| 28 | 0.551530E−03 | −0.241402E−04 | 0.704662E−06 | −0.105780E−07 |

Table 10 shows correspondence values of conditional expressions in the second example.

TABLE 10

| | | | Example 2 |
|---|---|---|---|
| | φ2Wx | | 0.00075 |
| | φ2Wy | | 0.00075 |
| | φ2Tx | | 0.00198 |
| | φ2Ty | | 0.00191 |
| | ftx | | 83.036 |
| | fty | | 82.953 |
| | fwx | | 4.632 |
| | fwy | | 4.632 |
| Conditional Expression (1) | ΔP2/Z | x | 0.147 |
| | | y | 0.142 |
| | |ΔLA| | | 16.9932 |

TABLE 10-continued

| | | | Example 2 |
|---|---|---|---|
| Conditional Expression (2) | \|ΔLA\|/ft | x | 0.205 |
| | | y | 0.205 |
| | \|ΔLB\| | | 16.7816 |
| Conditional Expression (3) | \|ΔLB\|/ft | x | 0.202 |
| | | y | 0.202 |
| | \|ΔP\| | | 2.240 |
| Conditional Expression (4) | \|ΔP\|/fw | | 0.484 |
| Conditional Expression (5) | \|ΔLA\|/\|ΔLB\| | | 1.013 |

Figure 6:
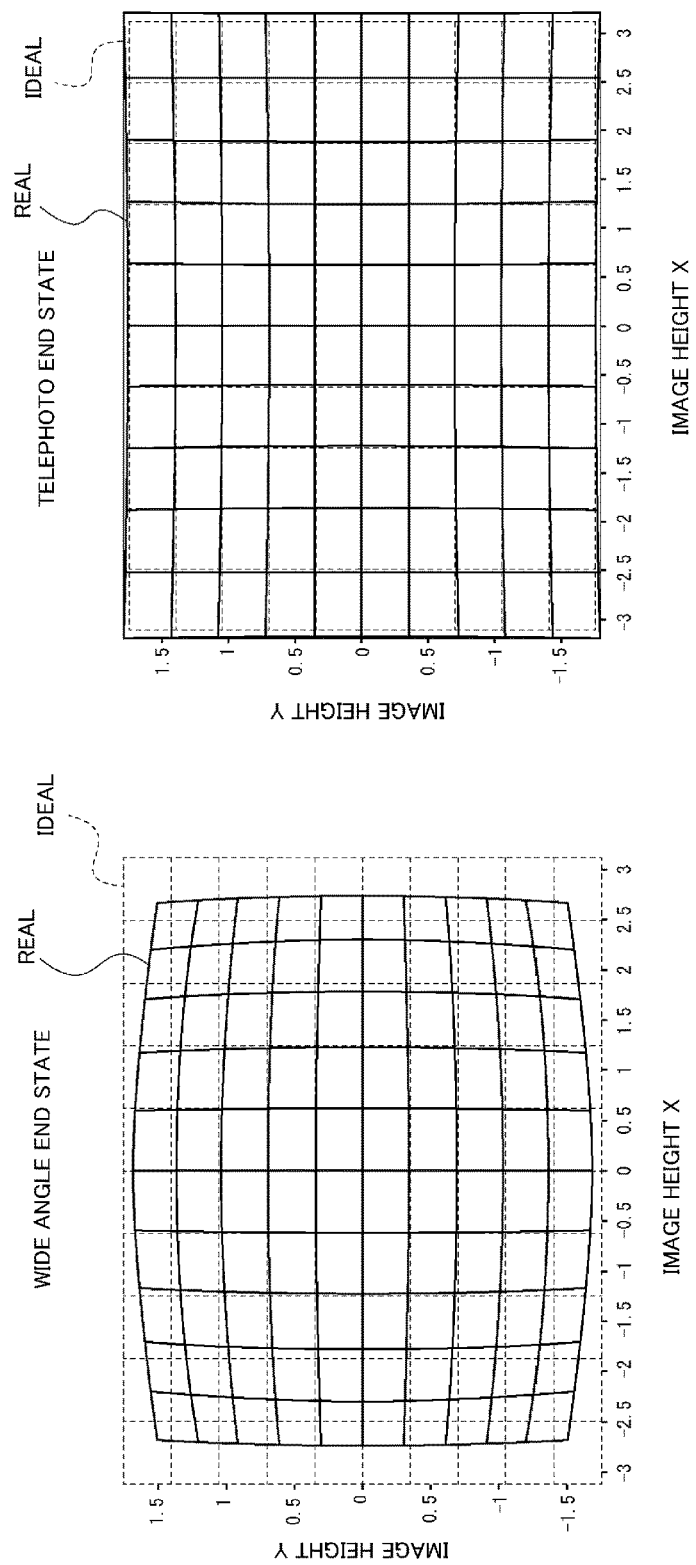
FIG. 6 is a spot diaphragm of the second example.
Figure 7:
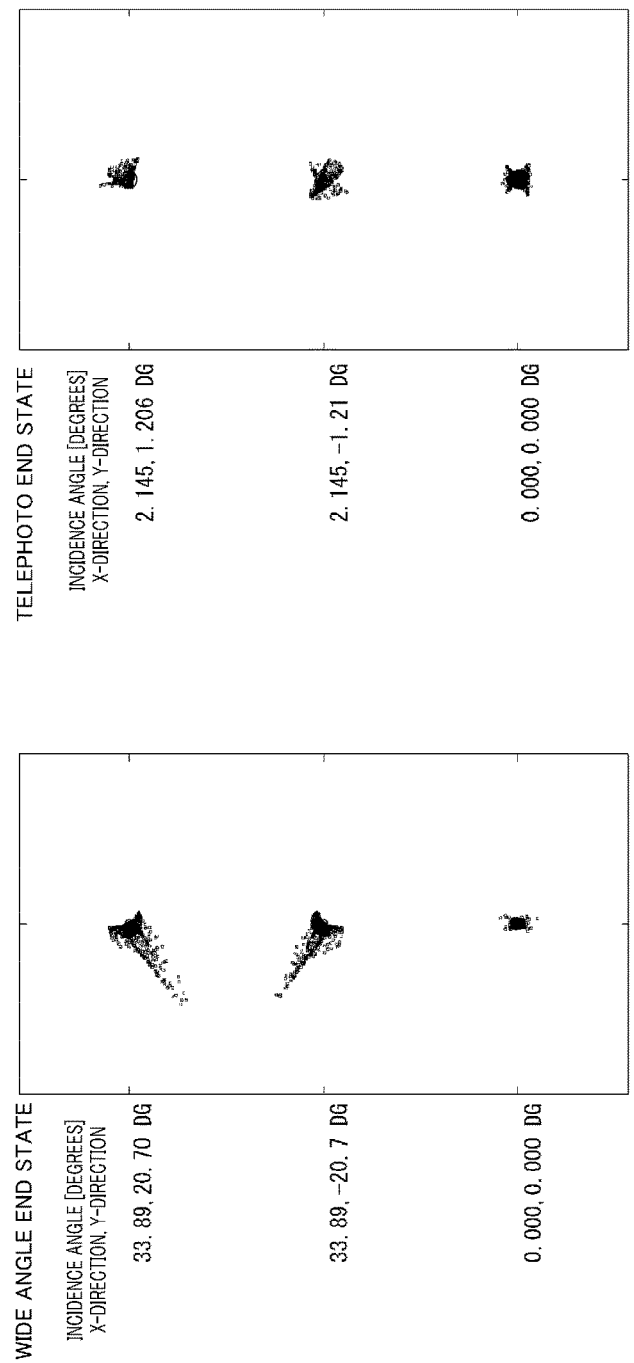
FIG. 7 is a diagram showing distortion aberration of the second example.

FIG. 6 shows spot diaphragms in a wide-angle end state and a telephoto end state in the second example, and FIG. 7 shows distortion aberration diagrams in the second example.

From the aberration diagrams, it is apparent that various aberrations are satisfactorily corrected and image forming performance is excellent in the present example.

Third Example

Figure 8:
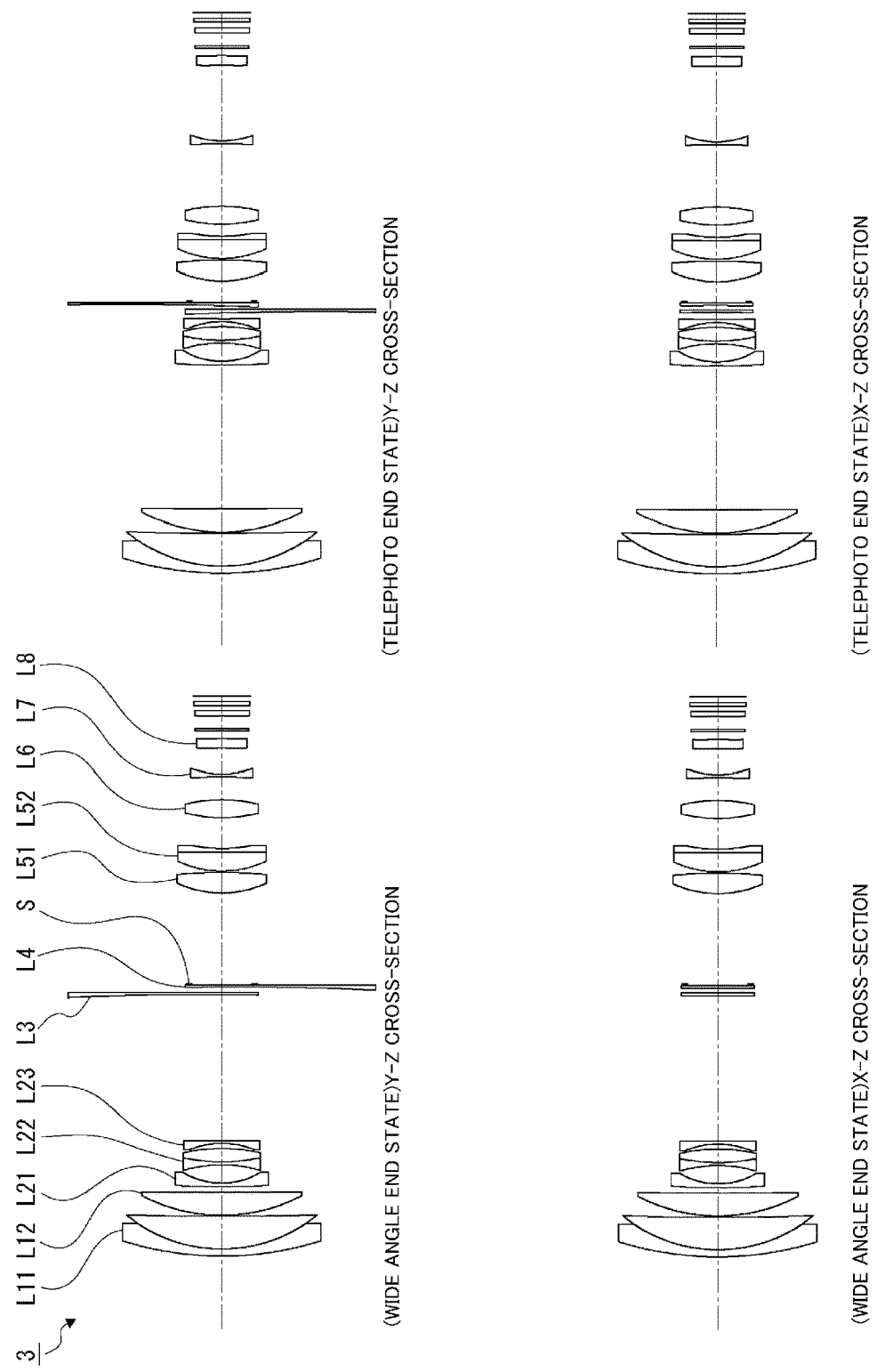
FIG. 8 is a diagram showing a lens configuration of a third example.

FIG. 8 shows a cross-sectional view of a lens of a variable focal distance lens system 3 according to a third example of the present technology.

A first lens group G1 includes a cemented lens L11 of a negative lens having a meniscus shape with a concave surface facing an image side and a positive lens with a convex surface facing an object side, and a positive lens L12 having a meniscus shape with a convex surface facing the object side.

A second lens group G2 includes a negative lens L21 having a concave surface facing an image side, a cemented lens L22 of a biconcave lens and a biconvex lens, and a negative lens L23 having a concave surface facing an object side.

A third lens group G3 includes one first freeform-curved surface lens L3, a fourth lens group G4 includes one second freeform-curved surface lens L4, and the first freeform-curved surface lens L3 and the second freeform-curved surface lens L4 are disposed to be reversed with respect to the Z-axis.

A fifth lens group G5 includes a biconvex positive lens L51 and a cemented lens L52 of a positive lens with a convex surface facing an object side and a negative lens with a concave surface facing an image side.

A sixth lens group G6 includes a biconvex positive lens L6.

A seventh lens group G7 includes a negative lens L7 with a concave surface facing an image side.

An eighth lens group G8 includes a positive lens L8 with a convex surface facing an image side.

Various values in the third example of the present technology are shown in the following Tables 11 to 14. Table 11 shows lens data such as a radius of curvature of each lens, Table 12 shows variable intervals and the amounts of movement (zoom displacement amounts) at the time of changing a focal distance, Table 13 shows XY freeform-curved surface coefficients (XY polynomial expression coefficients) representing the shapes of freeform-curved surface lenses, and Table 14 shows aspherical coefficients.

Furthermore, meanings of signs shown in the following tables and description, and the like are as described below.

In Table 11, "Radius of curvature" indicates a reciprocal number of a curvature, "0" in the "Radius of curvature" indicates a flat surface, "Dn" indicates an axial surface distance (the thickness of the center of a lens or an air gap) which is a variable interval between an n-th surface and an n+1-th surface, and "Refractive index" and "Abbe number" indicate a refractive index and an Abbe number in a d line (λ=587.6 nm). In Table 12, "x" and "y" indicate values in the X-axis direction and the Y-axis direction, and "Y shift amount" indicates the amounts of movement of the first freeform-curved surface lens L3 and the second freeform-curved surface lens L4 in the Y-axis direction.

TABLE 11

| Surface number | Shape | Radius of curvature | Interval | Refractive index | Abbe number |
|---|---|---|---|---|---|
| 1 | Spherical surface | 44.87639 | 1.000 | 1.90313 | 31.32 |
| 2 | Spherical surface | 20.59631 | 4.487 | 1.49700 | 81.61 |
| 3 | Spherical surface | 456.31757 | 0.150 | | |
| 4 | Spherical surface | 23.61863 | 3.146 | 1.72916 | 54.76 |
| 5 | Spherical surface | 646.45580 | (D5) | | |
| 6 | Aspherical surface | −180.00000 | 0.500 | 1.88202 | 37.22 |
| 7 | Aspherical surface | 11.8900 | 2.453 | | |
| 8 | Spherical surface | −18.63701 | 0.400 | 1.83500 | 42.98 |
| 9 | Spherical surface | 22.91574 | 1.887 | 1.94595 | 17.98 |
| 10 | Spherical surface | −23.4748 | 0.678 | | |
| 11 | Spherical surface | −11.80000 | 0.400 | 1.80420 | 46.50 |
| 12 | Spherical surface | 500.00000 | (D12) | | |
| 13 | Freedom-curved surface | 0 | 0.300 | 1.51680 | 64.20 |
| 14 | Flat surface | 0 | 0.700 | | |
| 15 | Freedom-curved surface | 0 | 0.300 | 1.51680 | 64.20 |
| 16 | Flat surface | 0 | 0.200 | | |
| 17 | Flat surface | 0 | (D17) | | |
| 18 | Aspherical surface | 14.50000 | 2.800 | 1.59201 | 67.02 |
| 19 | Aspherical surface | −62.60442 | 0.2000 | | |
| 20 | Spherical surface | 14.0000 | 2.617 | 1.56849 | 71.72 |
| 21 | Spherical surface | 414.00630 | 0.500 | 1.91716 | 25.60 |
| 22 | Spherical surface | 22.66530 | (D22) | | |
| 23 | Aspherical surface | 16.83065 | 2.500 | 1.49700 | 81.61 |
| 24 | Aspherical surface | −19.55617 | (D24) | | |
| 25 | Aspherical surface | −124.55545 | 0.400 | 1.80420 | 46.50 |
| 26 | Aspherical surface | 11.50000 | (D26) | | |
| 27 | Aspherical surface | −50.00000 | 1.310 | 1.55332 | 71.68 |
| 28 | Aspherical surface | −23.61978 | 1.050 | | |
| 29 | Flat surface | 0 | 0.300 | 1.51680 | 64.20 |
| 30 | Flat surface | 0 | 1.750 | | |
| 31 | Flat surface | 0 | 0.750 | 1.51680 | 64.20 |
| 32 | Flat surface | 0 | 0.700 | | |

TABLE 11-continued

| Surface number | Shape | Radius of curvature | Interval | Refractive index | Abbe number |
|---|---|---|---|---|---|
| 33 | Flat surface | 0 | 0.500 | 1.51680 | 64.20 |
| 34 | Flat surface | 0 | 0.800 | | |

TABLE 12

| Amount of zooming | | Wide angle end state | Intermediate focal distance | Telephoto end state |
|---|---|---|---|---|
| Focal distance | x | 4.6392 | 18.8781 | 82.8120 |
| | y | 4.6397 | 18.8575 | 82.7243 |
| F number | x | 2.081 | 3.887 | 4.324 |
| | y | 2.081 | 3.883 | 4.319 |
| Object distance | | Infinity | Infinity | Infinity |
| Interval | D5 | 0.8456 | 11.4358 | 19.8921 |
| Interval | D12 | 20.0465 | 9.4563 | 1.0000 |
| Y shift amount | 13 surfaces 14 surfaces | 0 | −8.0000 | −16.0000 |
| Y shift amount | 15 surfaces 16 surfaces | 0 | +8.0000 | +16.0000 |
| Interval | D17 | 12.5095 | 5.8838 | 2.7000 |
| Diaphragm diameter | | 8.207 | 6.917 | 8.011 |
| Interval | D22 | 4.2175 | 2.3665 | 1.6300 |
| Interval | D24 | 3.1276 | 4.9025 | 8.5866 |
| Interval | D26 | 3.5219 | 10.2238 | 10.4600 |
| Interval when object distance is 800 mm | D24 | 3.1496 | 5.0125 | 10.6529 |
| Interval when object distance is 800 mm | D26 | 3.5000 | 10.1139 | 8.3936 |

TABLE 13

| Surface number | Coefficient |
|---|---|
| 13 | Y: 5.3914E−03 X2: −1.1037E−03 Y2: −1.1210E−03 X2Y: 4.2496E−05 Y3: 3.8036E−05 X4: −1.3862E−05 X2Y2: −2.3057E−05 Y4: −9.9435E−06 X4Y: 4.9568E−06 X2Y3: 3.0226E−06 Y5: 1.0913E−06 X6: 1.7991E−07 X4Y2: −5.8445E−07 X2Y4: −1.4889E−07 Y6: −6.8006E−08 X6Y: 2.9180E−09 X4Y3: 3.8244E−08 X2Y5: 3.0586E−10 Y7: 2.5787E−09 X8: −8.0657E−09 X6Y2: −7.1570E−09 X4Y4: −1.5730E−09 X2Y6: 1.9756E−10 Y8: −5.9760E−11 X8Y: 9.7218E−10 X6Y3: 3.8391E−10 X4Y5: 3.1736E−11 X2Y7: −4.2759E−12 Y9: 6.9787E−13 |
| 15 | Y: −5.3914E−03 X2: −1.1037E−03 Y2: −1.1210E−03 X2Y: −4.2496E−05 Y3: −3.8036E−05 X4: −1.3862E−05 X2Y2: −2.3057E−05 Y4: −9.9435E−06 X4Y: −4.9568E−06 X2Y3: −3.0226E−06 Y5: −1.0913E−06 X6: 1.7991E−07 X4Y2: −5.8445E−07 X2Y4: −1.4889E−07 Y6: −6.8006E−08 X6Y: −2.9180E−09 X4Y3: −3.8244E−08 X2Y5: −3.0586E−10 Y7: −2.5787E−09 X8: −8.0657E−09 X6Y2: −7.1570E−09 X4Y4: −1.5730E−09 X2Y6: 1.9756E−10 Y8: −5.9760E−11 X8Y: −9.7218E−10 X6Y3: −3.8391E−10 X4Y5: −3.1736E−11 X2Y7: 4.2759E−12 Y9: −6.9787E−13 |

TABLE 14

| Surface number | A | B | C | D |
|---|---|---|---|---|
| 6 | 0.269741E−03 | −0.322108E−05 | 0.144199E−07 | 0.000000 E+00 |
| 7 | 0.256481E−03 | −0.181160E−05 | 0.138319E−06 | −0.284711 E−08 |
| 18 | −0.274661E−04 | −0.141646E−06 | 0.770396E−08 | 0.000000 E+00 |

TABLE 14-continued

| Surface number | A | B | C | D |
|---|---|---|---|---|
| 19 | 0.299897E−05 | 0.284392E−06 | 0.581550E−08 | 0.000000 E+00 |
| 23 | −0.247856E−03 | 0.368344E−07 | 0.459418E−07 | 0.000060 E+00 |
| 24 | 0.439239E−04 | −0.245655E−07 | 0.478099E−07 | 0.000000 E+00 |
| 25 | −0.248457E−03 | 0.816196E−05 | 0.277077E−07 | 0.000000 E+00 |
| 26 | −0.310579E−03 | 0.517451E−05 | 0.251468E−06 | 0.000000 E+00 |
| 27 | 0.988248E−03 | −0.162739E−04 | 0.669024E−06 | −0.794752 E−08 |
| 28 | 0.180000E−02 | −0.141685E−04 | 0.988446E−06 | −0.156939 E−08 |

Table 15 shows correspondence values of conditional expressions in the third example.

TABLE 15

| | | | Example 3 |
|---|---|---|---|
| | φ 2Wx | | −0.00229 |
| | φ 2Wy | | −0.00233 |
| | φ 2Tx | | −0.00253 |
| | φ 2Ty | | −0.00263 |
| | ftx | | 82.812 |
| | fty | | 82.724 |
| | fwx | | 4.639 |
| | fwy | | 4.640 |
| Conditional Expression (1) | Δ P2/Z | x | 0.062 |
| | | y | 0.063 |
| Conditional Expression (2) | \|ΔLA\| | | 16 |
| | \|ΔLA\|/ft | | 0.193 |
| Conditional Expression (3) | \|ΔLB\| | | 16 |
| | \|ΔLB\|/ft | | 0.193 |
| Conditional Expression (4) | \|ΔP\| | | 1.5 |
| | \|ΔP\|/fw | | 0.323 |
| Conditional Expression (5) | \|ΔLA\|/\|ΔLB\| | | 1.000 |

Figure 9:
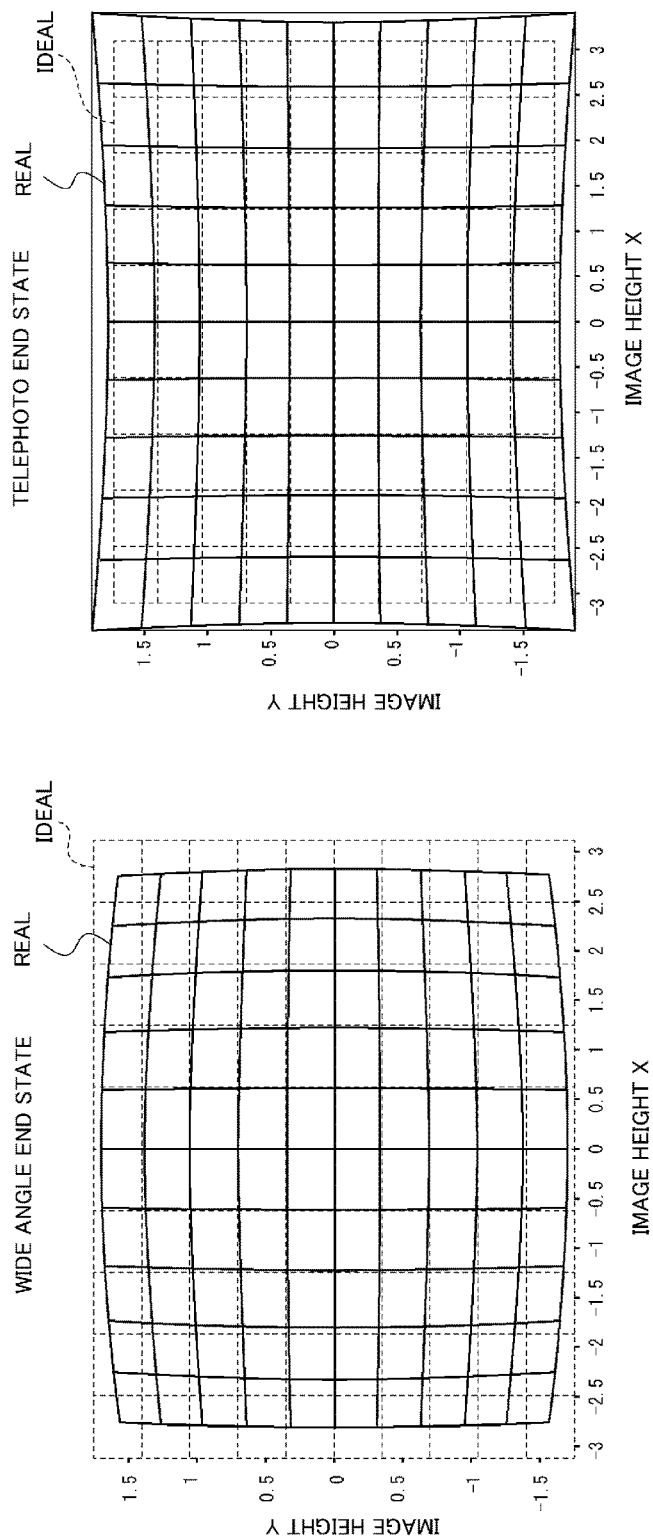
FIG. 9 is a spot diaphragm of the third example.
Figure 10:
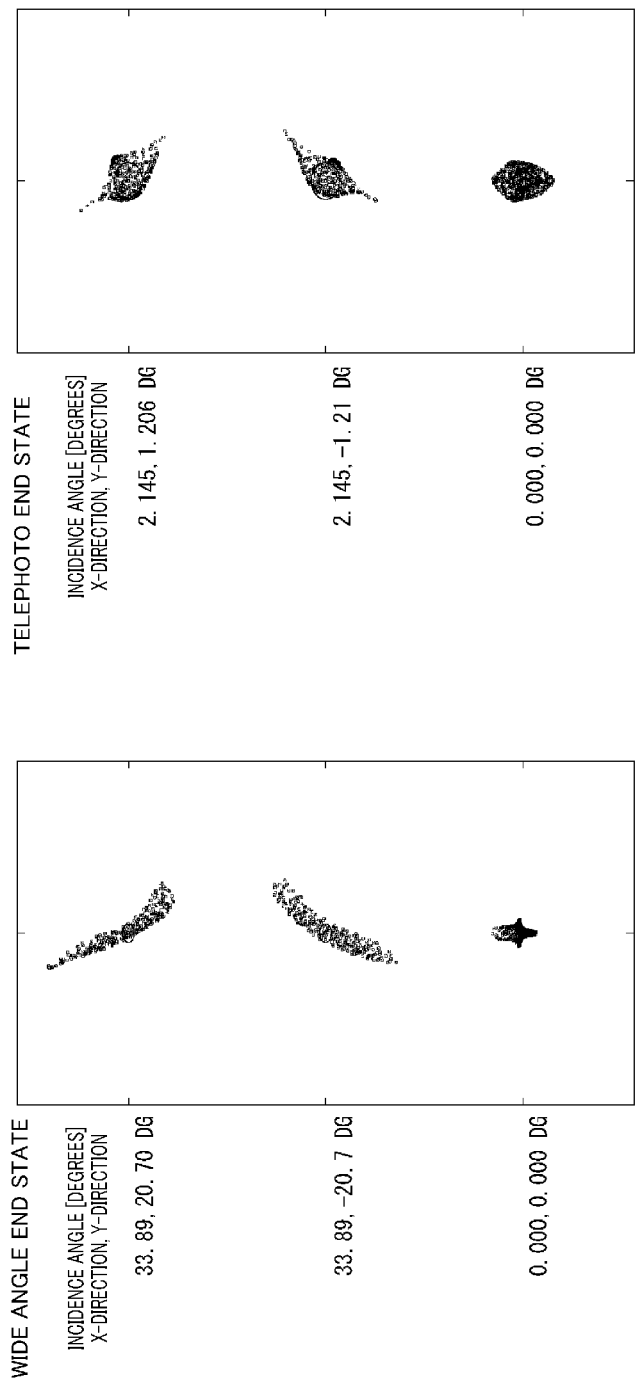
FIG. 10 is a diagram showing distortion aberration of the third example.

FIG. 9 shows spot diaphragms in a wide-angle end state and a telephoto end state in the third example, and FIG. 10 shows distortion aberration diagrams in the third example.

From the aberration diagrams, it is apparent that various aberrations are satisfactorily corrected and image forming performance is excellent in the present example.

[Configuration of Imaging Device]

In an imaging device of the present technology, a variable focal distance lens system includes a first lens unit including at least one lens group, a second lens unit including a first freeform-curved surface lens and a second freeform-curved surface lens, and a third lens unit including at least one lens group in this order from an object side to an image side.

In addition, according to the imaging device of the present technology, in the variable focal distance lens system, the first lens unit and the third lens unit are constituted by a lens having a shape rotationally symmetrical to an optical axis and are disposed on the same optical axis, and the first freeform-curved surface lens and the second freeform-curved surface lens have the same shape and are disposed to be rotated at 180 degrees about the optical axis.

Additionally, according to the imaging device of the present technology, in the variable focal distance lens system, when a refractive power of the second lens unit is variable due to the first freeform-curved surface lens and the second freeform-curved surface lens moving in opposite directions, and positional states of the lenses are changed from a wide-angle end state in which a focal distance is shortest to a telephoto end state in which a focal distance is longest, the first freeform-curved surface lens and the second freeform-curved surface lens are moved in the Y-axis direction in association with the movement of some of lens groups constituting the first lens unit and the third lens unit.

Additionally, according to the imaging device of the present technology, in the variable focal distance lens system, when a refractive power of the second lens unit is variable due to the first freeform-curved surface lens and the second freeform-curved surface lens moving in opposite directions, and positional states of the lenses are changed from a wide angle end state in which a focal distance is shortest to a telephoto end state in which a focal distance is longest, the first freeform-curved surface lens and the second freeform-curved surface lens are moved in the Y-axis direction in association with the movement of some of lens groups constituting the first lens unit and the third lens unit.

According to the imaging device of the present technology, in the variable focal distance lens system, the first freeform-curved surface lens and the second freeform-curved surface lens have the same shape and are disposed to be rotated at 180 degrees with respect to the Z-axis. In addition, a combined refractive power of the second lens unit changes due to the first freeform-curved surface lens and the second freeform-curved surface lens moving in opposite directions. By combining this with a general zoom lens, the overall optical length is shortened while keeping the position of the image surface constant.

In a zoom lens of the related art, a moving direction of each lens group is only an optical axis direction. On the other hand, in the imaging device of the present technology, the degree of freedom for changing a focal distance is increased by moving two freeform-curved surface lenses of the variable focal distance lens system in a direction other than an optical axis direction.

In particular, the first freeform-curved surface lens and the second freeform-curved surface lens are formed to have the same shape to smoothen free-curved surface shapes, and it is possible to prevent the degradation of performance due to a deviation in a stop position and eccentricity of the freeform-curved surfaces (tilt or movement of the lens surfaces on the object side and the image side).

In addition, when a focal distance is changed, the first freeform-curved surface lens and the second freeform-curved surface lens are moved in opposite direction by the same amount, so that the occurrence of aberration caused by an asymmetrical shape is canceled by the two lenses, that is, the first freeform-curved surface lens and the second freeform-curved surface lens, thereby realizing good optical performance.

As described above, according to the imaging device of the present technology, it is possible to provide a small and high-magnification imaging device exhibiting various effects.

[Embodiment of Imaging Device]

Figure 11:
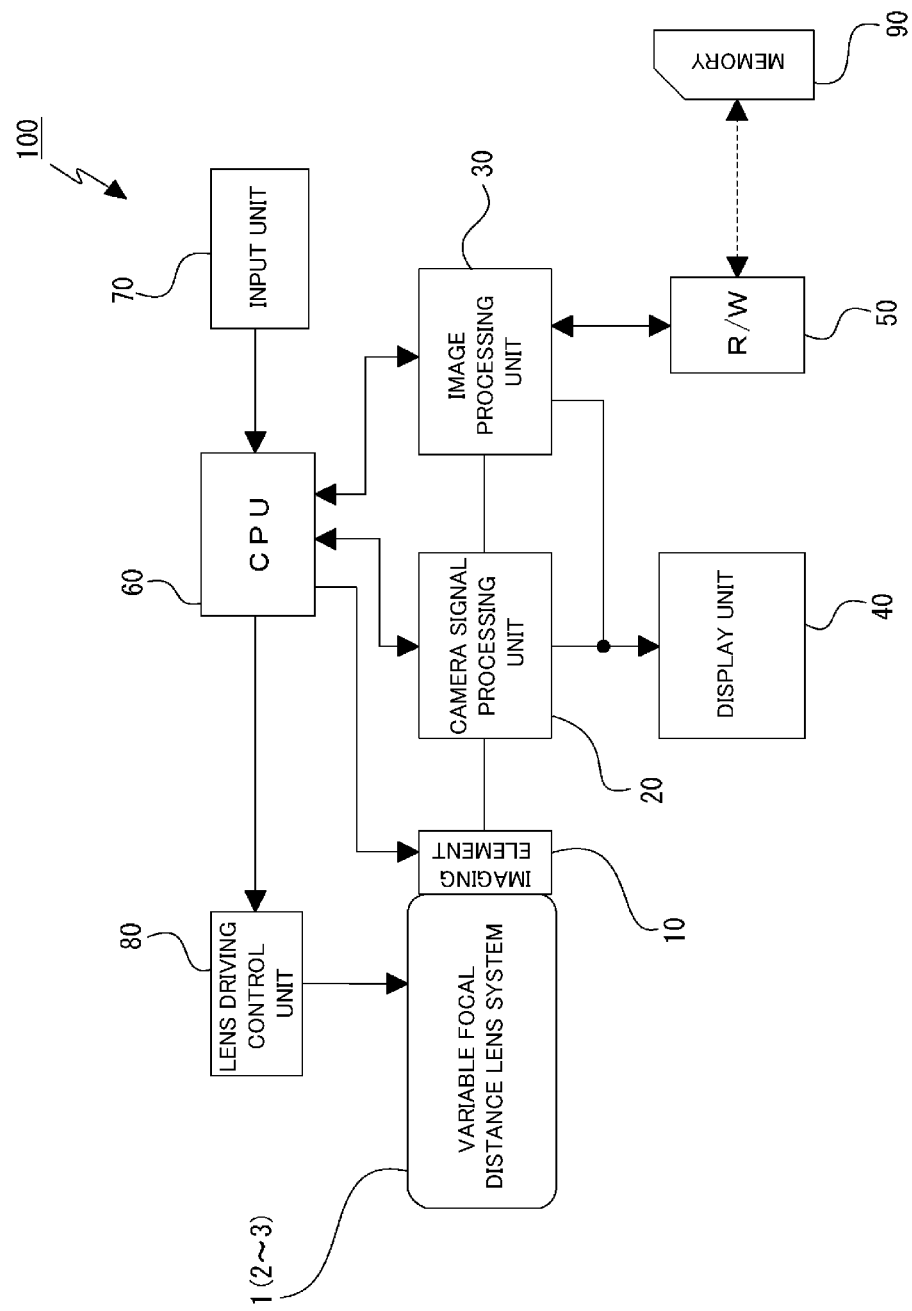
FIG. 11 is a block diagram showing an example of an imaging device.

FIG. 11 shows a block diagram of a digital still camera according to an embodiment of the imaging device of the present technology.

An imaging device (digital still camera) 100 includes an imaging element 10 having a photoelectric conversion function of converting captured light into an electrical signal, a camera signal processing unit 20 performing signal processing such as analog-digital conversion of a captured image signal, and an image processing unit 30 performing recording reproduction processing of an image signal. In addition, the imaging device 100 includes a display unit 40 that displays a captured image or the like, a reader/writer (R/W) 50 that writes and reads an image signal in and from a memory 90, a central processing unit (CPU) 60 that controls the entire imaging device 100, an input unit 70 such as various switches on which a required operation is performed by a user, and a lens driving control unit 80 that controls the driving of a lens group (variable group).

The camera signal processing unit 20 performs various signal processing such as conversion of a signal output from the imaging element 10 into a digital signal, noise removal, image quality correction, and conversion into luminance and a color difference signal.

The image processing unit 30 performs compression encoding and expansion decoding processing of an image signal, conversion processing of data specifications such as a resolution, and the like based on a predetermined image data format.

The display unit 40 has a function of displaying various data such as an operation state of a user with respect to the input unit 70, and captured images.

The R/W 50 writes image data encoded by the image processing unit 30 in the memory 90 and read image data recorded in the memory 90.

The CPU 60 functions as a control processing unit that controls circuit blocks provided in the imaging device 100, and controls the circuit blocks on the basis of an instruction input signal received from the input unit 70.

The input unit 70 outputs an instruction input signal according to a user's operation to the CPU 60.

The lens driving control unit 80 controls a motor or the like, not shown in the drawing, which drives a lens group on the basis of a control signal received from the CPU 60.

The memory 90 is a semiconductor memory which is attachable or detachable to or from, for example, a slot connected to the R/W 50. Furthermore, the memory 90 is not configured to be attachable or detachable to or from the slot, and may be embedded in the imaging device 100.

Hereinafter, operations in the imaging device 100 will be described.

In an imaging standby state, a captured image signal is output to the display unit 40 through the camera signal processing unit 20 under the control of the CPU 60 and is displayed as a camera through image.

When image is performed in response to an instruction input signal received from the input unit 70, a captured image signal is output from the camera signal processing unit 20 to the image processing unit 30 to be subjected to compression encoding processing, and is converted into digital data in a predetermined data format. The converted data is output to the R/W 50 and written in the memory 90.

Focusing is performed by causing the lens driving control unit 80 to move a focus lens group in response to a control signal received from the CPU 60.

In a case where image data recorded in the memory 90 is reproduced, predetermined image data is read from the memory 90 by the R/W 50 in response to an operation performed on the input unit 70, expansion decoding processing is performed by the image processing unit 30, and then a reproduction image signal is output to the display unit 40, thereby displaying a reproduction image.

Furthermore, in the present technology, "imaging" refers to only some of a series of processes including photoelectric conversion processing for converting light captured by the imaging element 10 into an electrical signal, conversion of a signal output from the imaging element 10 into a digital signal performed by the camera signal processing unit 20, noise removal, image quality correction, and conversion into luminance and a color difference signal, compression encoding and expansion decoding processing of an image signal and conversion processing of data specifications such as a resolution, and the like based on a predetermined image data format performed by the image processing unit 30, and processing for writing an image signal in the memory 90 by the R/W 50, or refers to including all of the processes.

That is, "imaging" may indicate only photoelectric conversion processing for converting light captured by the imaging element 10 into an electrical signal, may indicate processing from photoelectric conversion processing for converting light captured by the imaging element 10 into an electrical signal to processing such as conversion of a signal output from the imaging element 10 into a digital signal performed by the camera signal processing unit 20, noise removal, image quality correction, and conversion into luminance and a color difference signal, may indicate processing including photoelectric conversion processing for converting light captured by the imaging element 10 into an electrical signal, processing such as conversion of a signal output from the imaging element 10 into a digital signal performed by the camera signal processing unit 20, noise removal, image quality correction, and conversion into luminance and a color difference signal, compression encoding and expansion decoding processing of an image signal based on a predetermined image data format performed by the image processing unit 30, and conversion processing of data specifications such as a resolution, and the like, may indicate processing including photoelectric conversion processing for converting light captured by the imaging element 10 into an electrical signal, processing such as conversion of a signal output from the imaging element 10 into a digital signal performed by the camera signal processing unit 20, noise removal, image quality correction, and conversion into luminance and a color difference signal, compression encoding and expansion decoding processing of an image signal based on a predetermined image data format performed by the image processing unit 30, and conversion processing of data specifications such as a resolution, and the like, or may indicate processing up to processing for wiring an image signal in the memory 90 by the R/W 50. In the above-described processing, the order of the processes may be changed.

Furthermore, in the present technology, the imaging device 100 may be configured to include only some or all of the imaging element 10, the camera signal processing unit 20, the image processing unit 30, and the R/W 50 that perform the above-described processing.

[Others]

In the variable focal distance lens system of the present technology system and the imaging device of the present technology, other optical elements such as a lens not having a refractive power may be disposed in addition to the first lens group G1 to the eighth lens group G8. In this case, a lens configuration of the variable focal distance lens system of the present technology system is substantially an eight-group lens configuration of the first lens group G1 to the eighth lens group G8.

Furthermore, the above-mentioned imaging device can be widely applied as a camera part of a digital input and output equipment such as a digital still camera, a digital video camera, or a portable terminal, for example, a mobile phone having a camera embedded therein or a tablet having a camera embedded therein.

Application Example 1

The technology according to the present disclosure can be applied to various products. For example, the technology according to the present disclosure may be applied to an operating room system.

Figure 12:
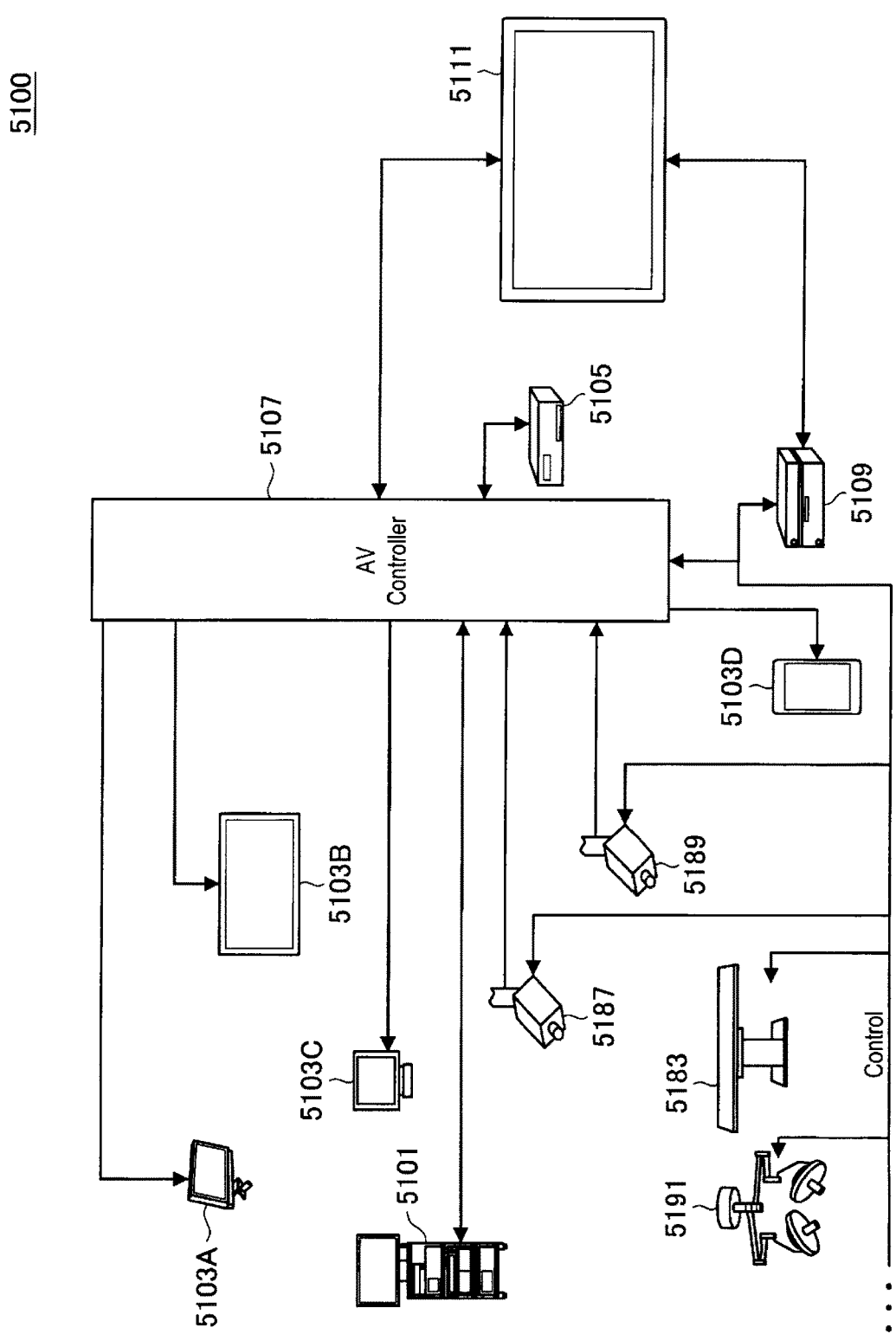
FIG. 12 is a diagram schematically showing an overall configuration of an operating room system.

FIG. 12 is a diagram schematically showing an overall configuration of an operating room system 5100 to which the technology according to the present disclosure can be applied. Referring to FIG. 12, the operating room system 5100 is configured such that device groups installed in a surgical operating room are connected to each other in association with each other through an audio-visual controller (AV controller) 5107 and a surgical operating room control device 5109.

In a surgical operating room, various devices can be installed. As an example, FIG. 12 illustrates various device groups 5101 for an endoscopic surgical operation, a ceiling camera 5187 that is provided on the ceiling of the surgical operating room and captures an image of a surgeon's hands, an operation place camera 5189 that is provided on the ceiling of the surgical operating room and captures an image of the state of the entire surgical operating room, a plurality of display devices 5103A to 5103D, a recorder 5105, a patient bed 5183, and a lighting apparatus 5191.

Here, among these devices, the device group 5101 belongs to an endoscope surgical operation system 5113 to be described later, and is constituted by an endoscope, a display device which displays an image captured by the endoscope, and the like. Devices belonging to the endoscope surgical operation system 5113 are also referred to as medical instruments. On the other hand, the display devices 5103A to 5103D, the recorder 5105, the patient bed 5183, and the lighting apparatus 5191 are devices included, for example, in a surgical operating room, independently of the endoscope surgical operation system 5113. These devices that do not belong to the endoscope surgical operation system 5113 are also referred to as non-medical instruments. The audio-visual controller 5107 and/or the surgical operating room control device 5109 control operations of the medical instruments and the non-medical instruments in association with each other.

The audio-visual controller 5107 generally controls processing related to image display in the medical instruments and the non-medical instruments. Specifically, among the devices included in the operating room system 5100, the device group 5101, the ceiling camera 5187, and the operation place camera 5189 may be devices (hereinafter, also referred to as a signal transmission source device) having a function of transmitting information displayed during a surgical operation (hereinafter, also referred to as display information). In addition, the display devices 5103A to 5103D may be devices to which display information is output (hereinafter, also referred to as an output destination device). In addition, the recorder 5105 may be a device corresponding to both a signal transmission source device and an output destination device. The audio-visual controller 5107 has a function of controlling operations of the signal transmission source device and the output destination device, acquiring display information from the signal transmission source device, transmitting the display information to the output destination device, and displaying or recording the display information. Meanwhile, the display information is various images captured during a surgical operation, various information on a surgical operation (for example, body information of a patient, past examination results, information on an operative method, and the like), and the like.

Specifically, information on an image of an operation part in the body cavity of a patient imaged by an endoscope can be transmitted to the audio-visual controller 5107 from the device group 5101 as display information. In addition, information on an image of a surgeon's hands imaged by the ceiling camera 5187 can be transmitted from the ceiling camera 5187 as display information. In addition, information on an image indicating the state of an entire surgical operating room imaged by the operation place camera 5189 can be transmitted from the operation place camera 5189 as display information. Meanwhile, in a case where the operating room system 5100 includes another device having an imaging function, the audio-visual controller 5107 may acquire information on an image, which is captured by the other device, from the other device as display information.

Alternatively, for example, information on images captured in the past is recorded in the recorder 5105 by the audio-visual controller 5107. The audio-visual controller 5107 can acquire information on the images captured in the past from the recorder 5105 as display information. Meanwhile, various information on a surgical operation may also be recorded in the recorder 5105 in advance.

The audio-visual controller 5107 causes at least any one of the display devices 5103A to 5103D, which are output destination devices, to display acquired display information (that is, an image captured during a surgical operation, and various information on a surgical operation). In the example shown in the drawing, the display device 5103A is a display device installed to be suspended from the ceiling of the surgical operating room, the display device 5103B is a display device installed on a wall surface of the surgical operating room, the display device 5103C is a display device installed on a desk in the surgical operating room, and the display device 5103D is a mobile equipment having a display function (for example, a tablet personal computer (PC)).

In addition, although not shown in FIG. 12, the operating room system 5100 may include an external device of the surgical operating room. The external device of the surgical operating room may be, for example, a server connected to a network constructed inside or outside a hospital, a PC used by a medical staff, a projector installed in a conference room of a hospital, or the like. In a case where such an external device is installed outside a hospital, the audio-visual controller 5107 can display information on a display device of another hospital through a video conference system or the like for remote medical treatment.

The surgical operating room control device 5109 generally controls processing other than processing related to image display in a non-medical instrument. For example, the surgical operating room control device 5109 controls driving of the patient bed 5183, the ceiling camera 5187, the operation place camera 5189, and the lighting apparatus 5191.

The operating room system 5100 is provided with a centralized operation panel 5111, and a user can give an instruction regarding image display to the audio-visual controller 5107 or give an instruction regarding an operation of a non-medical instrument to the surgical operating room control device 5109 through the centralized operation panel 5111. The centralized operation panel 5111 is configured such that a touch panel is provided on a display surface of the display device.

Figure 13:
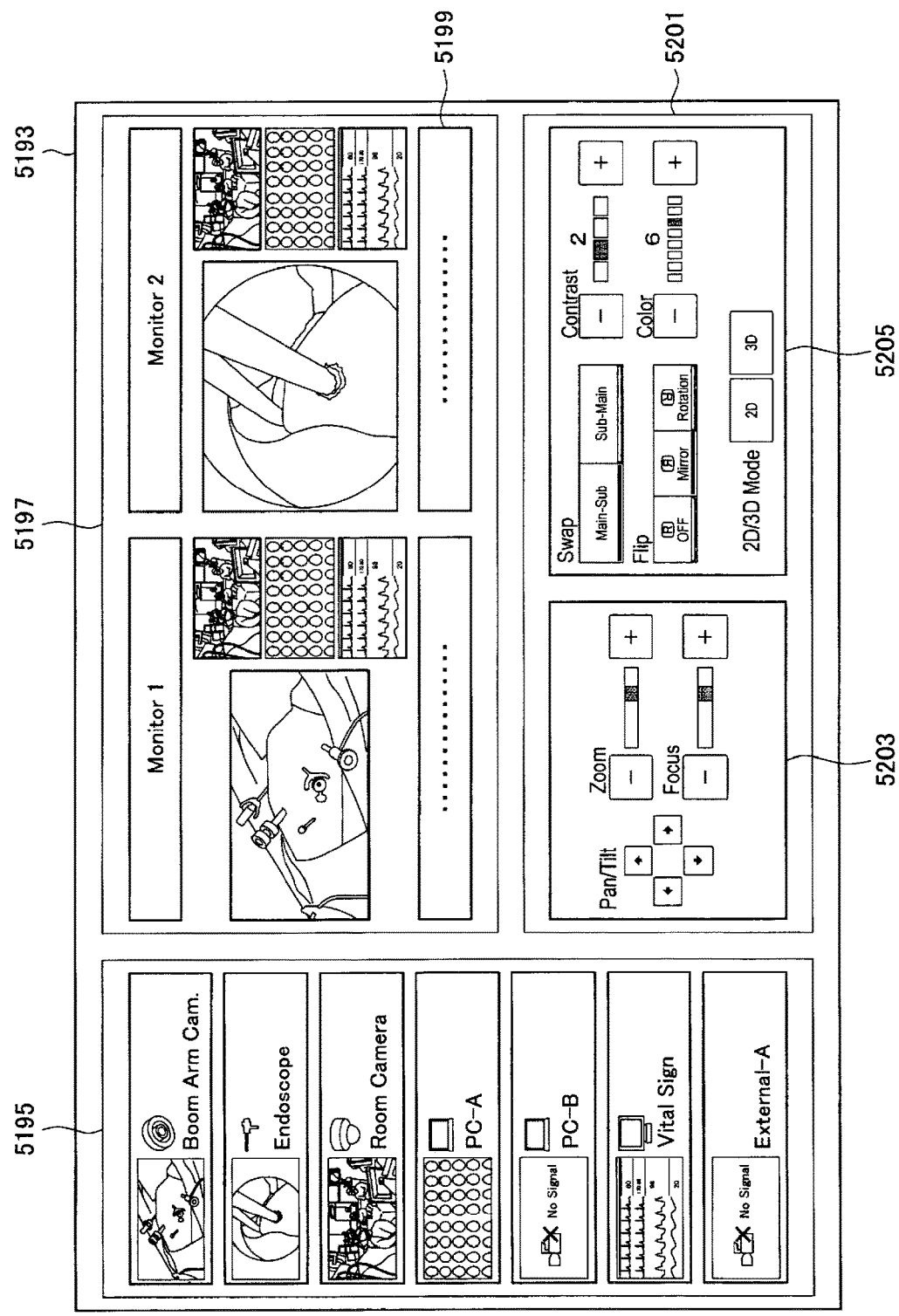
FIG. 13 is a diagram showing an example of the display of an operation screen in a centralized operation panel.

FIG. 13 is a diagram showing an example of display of an operation screen in the centralized operation panel 5111. As an example, FIG. 13 shows an operation screen corresponding to a case where the operating room system 5100 is provided with two display devices as output destination devices. Referring to FIG. 13, the operation screen 5193 is provided with a signal transmission source selection region 5195, a preview region 5197, and a control region 5201.

In the signal transmission source selection region 5195, the signal transmission source device included in the operating room system 5100 and a thumbnail screen for displaying display information included in the signal transmission source device are displayed in association with each other. A user can select display information, which is desired to be displayed on the display device, from any one signal transmission source device displayed in the signal transmission source selection region 5195.

In the preview region 5197, preview of a screen displayed on two display devices (Monitor 1, Monitor 2) which are output destination devices is displayed. In an example shown in the drawing, four images are PinP-displayed on one display device. The four images correspond to display information transmitted from the signal transmission source device selected in the signal transmission source selection region 5195. Among the four images, one image is displayed relatively large as a main image, and the remaining three images are displayed relatively small as sub-images. A user can change the main image and the sub-image by appropriately selecting a region in which the four images are displayed. In addition, a status display region 5199 is provided below the region in which the four images are displayed, and a status related to a surgical operation (for example, an elapsed time of the surgical operation, body information of a patient, or the like) can be appropriately displayed in the region.

The control region 5201 is provided with a signal transmission source operation region 5203 in which a graphical user interface (GUI) component for performing an operation on the signal transmission source device is displayed, and an output destination operation region 5205 in which a GUI component for performing an operation on the output destination device is displayed. In an example shown in the drawing, a GUI component for performing various operations (panning, tilting, and zooming) on a camera in the signal transmission source device having an imaging function is provided in the signal transmission source operation region 5203. A user can operate the camera in the signal transmission source device by appropriately selecting these GUI components. Meanwhile, although not shown in the drawing, in a case where the signal transmission source device selected in the signal transmission source selection region 5195 is a recorder (that is, a case where an image recorded in the recorder in the past is displayed in the preview region 5197), a GUI component for performing an operation such as reproduction, reproduction stopping, rewinding, or fast forwarding of the image can be provided in the signal transmission source operation region 5203.

In addition, a GUI component for performing various operations (swapping, flipping, color adjustment, contrast adjustment, and switching between 2D display and 3D display) on a display in a display device which is an output destination device is provided in the output destination operation region 5205. A user can operate display on the display device by appropriately selecting these GUI components.

Meanwhile, an operation screen displayed on the centralized operation panel 5111 is not limited to the example shown in the drawing, and a user may be able to perform an operation input on the devices that can be controlled by the audio-visual controller 5107 and the surgical operating room control device 5109 included in the operating room system 5100 through the centralized operation panel 5111.

Figure 14:
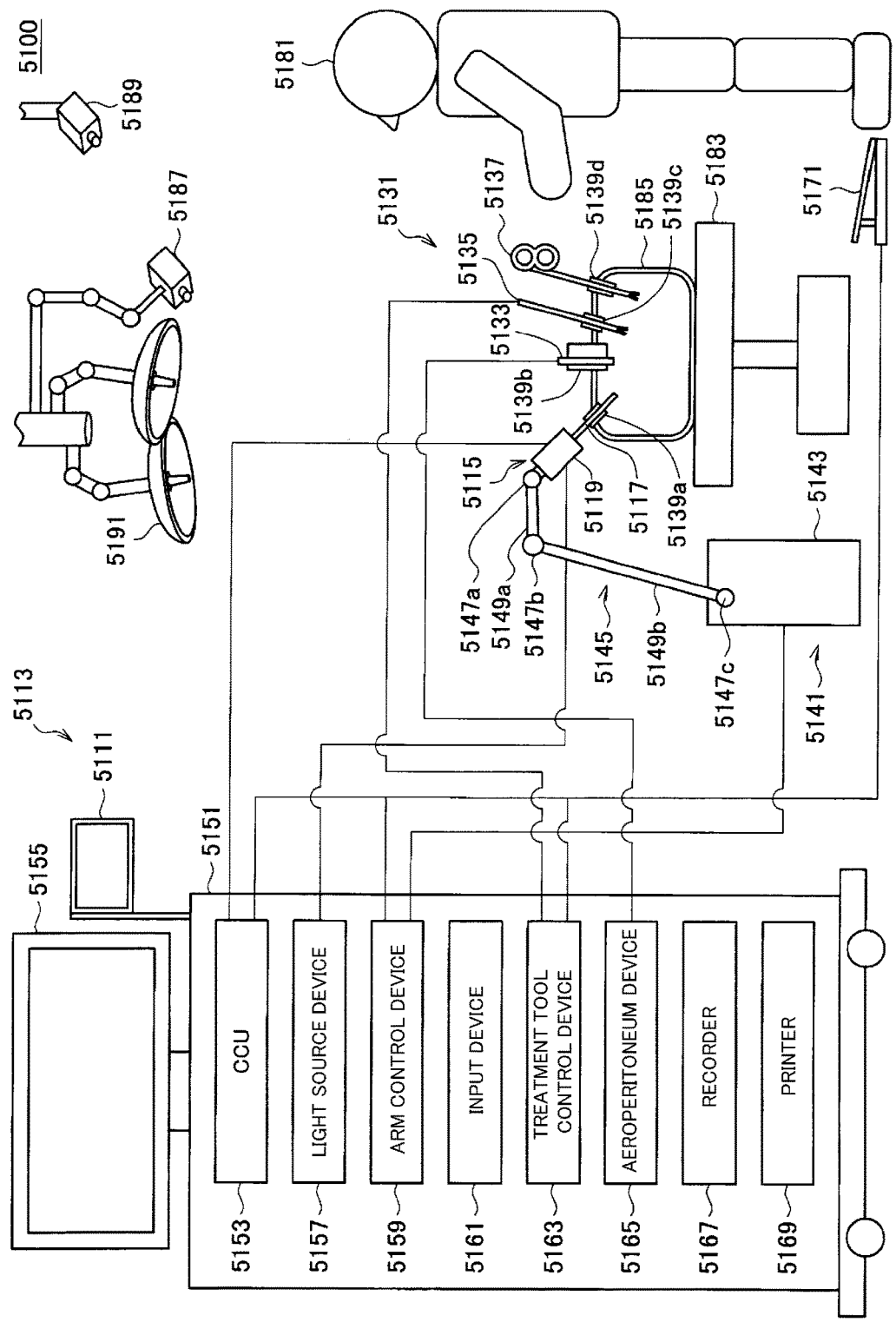
FIG. 14 is a diagram showing an example of the state of a surgical operation to which an operating room system is applied.

FIG. 14 is a diagram showing an example of the state of a surgical operation to which the above-described operating room system is applied. The ceiling camera 5187 and the operation place camera 5189 are provided on the ceiling of a surgical operating room and can capture an image of hands of a surgeon (doctor) 5181 performing treatment on an affected part of a patient 5185 on the patient bed 5183 and the state of the entire surgical operating room. The ceiling camera 5187 and the operation place camera 5189 may be equipped with a magnification adjustment function, a focal distance adjustment function, an imaging direction adjustment function, and the like. The lighting apparatus 5191 is provided on the ceiling of the surgical operating room and irradiates at least the hands of the surgeon 5181 with light. The lighting apparatus 5191 may be able to appropriately adjust the amount of irradiation light, the wavelength (color) of irradiation light, an irradiation direction of light, and the like.

The endoscope surgical operation system 5113, the patient bed 5183, the ceiling camera 5187, the operation place camera 5189, and the lighting apparatus 5191 are connected to each other in association with each other through the audio-visual controller 5107 and the surgical operating room control device 5109 (not shown in FIG. 14), as shown in FIG. 12. The centralized operation panel 5111 is provided in the surgical operating room, and a user can appropriately operate these devices provided in the surgical operating room through the centralized operation panel 5111, as described above.

Hereinafter, a configuration of the endoscope surgical operation system 5113 will be described in detail. As shown in the drawing, the endoscope surgical operation system 5113 includes an endoscope 5115, other operation tools 5131, a supporting arm device 5141 supporting the endoscope 5115, and a cart 5151 on which various devices for performing an endoscopic surgical operation are mounted.

In an endoscope surgical operation, a plurality of tubular laparotomy devices called trocars 5139a to 5139d are punctured into an abdominal wall, instead of cutting the abdominal wall to open an abdomen. In addition, a lens-barrel 5117 of the endoscope 5115 and the other operation tools 5131 are inserted into the body cavity of the patient 5185 from the trocars 5139a to 5139d. In an example shown in the drawing, a pneumoperitoneum tube 5133, an energy treatment tool 5135, and a forceps 5137 are inserted into the body cavity of the patient 5185 as the other operation tools 5131. In addition, the energy treatment tool 5135 is a treatment tool for performing cutting and peeling of tissues, sealing of blood vessels, or the like using a high-frequency current or ultrasonic vibration. However, the operation tools 5131 shown in the drawing are merely examples, and various operation tools generally used in an endoscopic surgical operation such as a tweezers or a retractor may be used as the operation tools 5131.

An image of an operation part within the body cavity of the patient 5185 which is captured by the endoscope 5115 is displayed on the display device 5155. The surgeon 5181 performs treatment such as cutting of, for example, an affected part using the energy treatment tool 5135 and the forceps 5137 while viewing the image of the operation part displayed on the display device 5155 in real time. Meanwhile, although not shown in the drawing, the pneumoperitoneum tube 5133, the energy treatment tool 5135, and the forceps 5137 are supported by the surgeon 5181, an assistant, or the like during a surgical operation.

(Supporting Arm Device)

The supporting arm device 5141 includes an arm portion 5145 extending from a base portion 5143. In an example shown in the drawing, the arm portion 5145 includes joint portions 5147a, 5147b, and 5147c and links 5149a and 5149b, and is driven under the control of the arm control device 5159. The endoscope 5115 is supported by the arm portion 5145, and the position and posture of the endoscope are controlled. Thereby, the fixing of a stable position of the endoscope 5115 may be realized.

(Endoscope)

The endoscope 5115 includes the lens-barrel 5117 in which a region having a predetermined length from the tip end thereof is inserted into the body cavity of the patient 5185, and a camera head 5119 connected to a base end of the lens-barrel 5117. In an example shown in the drawing, although the endoscope 5115 configured as a so-called hard mirror including a hard lens-barrel 5117 is shown, but the endoscope 5115 may be configured as a so-called soft mirror including a soft lens-barrel 5117.

A tip end of the lens-barrel 5117 is provided with an opening into which an object lens is fit. A light source device 5157 is connected to the endoscope 5115, and light generated by the light source device 5157 is guided to the tip end of the lens-barrel by a light guide extended inside the lens-barrel 5117 and is emitted toward an observation target within the body cavity of the patient 5185 through the object lens. Meanwhile, the endoscope 5115 may be a direct endoscope, a perspective mirror, or a side endoscope.

An optical system and an imaging element are provided inside the camera head 5119, light (observation light) reflected from an observation target is condensed on the imaging element by the optical system. The observation light is subjected to photoelectric conversion by the imaging element, and an electrical signal corresponding to the observation light, that is, an image signal corresponding to an observation image is generated. The image signal is transmitted to a camera control unit (CCU) 5153 as RAW data. Meanwhile, the camera head 5119 is equipped with a function of adjusting magnification and a focal distance by appropriately driving the optical system.

Meanwhile, for example, a plurality of imaging elements may be provided in the camera head 5119 in order to cope with stereoscopic vision (3D display) and the like. In this case, a plurality of relay optical systems are provided inside the lens-barrel 5117 in order to guide observation light to each of the plurality of imaging elements.

(Various Devices Mounted on Cart)

The CCU 5153 is constituted by a central processing unit (CPU), a graphics processing unit (GPU), and the like, and generally controls operations of the endoscope 5115 and the display device 5155. Specifically, the CCU 5153 performs various image processing for displaying an image based on an image signal received from the camera head 5119, such as development processing (demosaic processing), on the image signal. The CCU 5153 provides the image signal having been subjected to the image processing to the display device 5155. In addition, the audio-visual controller 5107 shown in FIG. 12 is connected to the CCU 5153. The CCU 5153 also provides the image signal having been subjected to the image processing to the audio-visual controller 5107. In addition, the CCU 5153 provides a control signal to the camera head 5119 to control the driving thereof. The control signal may include information on imaging conditions such as magnification and a focal distance. The information on imaging conditions may be input through the input device 5161 or may be input through the above-described centralized operation panel 5111.

The display device 5155 displays an image based on the image signal having been subjected to the image processing by the CCU 5153 under the control of the CCU 5153. In a case where the endoscope 5115 is an endoscope corresponding to high-resolution imaging such as 4K (the number of horizontal pixels 3840×the number of vertical pixels 2160) or 8K (the number of horizontal pixels 7680×the number of vertical pixels 4320) and/or is an endoscope corresponding to 3D display, a display device capable of performing high-resolution display and/or a display device capable of performing 3D display may be used as the display device 5155. In a case where the endoscope 5115 is an endoscope corresponding to high-resolution imaging such as 4K or 8K, a further immersion feeling can be obtained by using a display device having a size of 55 inches or more as the display device 5155. In addition, a plurality of display devices 5155 having different resolutions and sizes may be provided depending on the application.

The light source device 5157, which is constituted by a light source such as a light emitting diode (LED), supplies irradiation light used at the time of imaging an operation part to the endoscope 5115.

The arm control device 5159, which is constituted by a processor such as a CPU, controls the driving of the arm portion 5145 of the supporting arm device 5141 according to a predetermined control method by operating in accordance with a predetermined program.

The input device 5161 is an input interface for the endoscope surgical operation system 5113. A user can input various information and an instruction to the endoscope surgical operation system 5113 through the input device 5161. For example, the user inputs various information on a surgical operation, such as body information of a patient or information on an operative method of the surgical operation, through the input device 5161. In addition, for example, the user inputs an instruction indicating that the arm portion 5145 is driven, an instruction indicating that imaging conditions of the endoscope 5115 (the type of irradiation light, magnification, a focal distance, and the like) are changed, an instruction indicating that the energy treatment tool 5135 is driven, or the like through the input device 5161.

The type of input device 5161 is not limited, and the input device 5161 may be any of various known input devices. For example, a mouse, a keyboard, a touch panel, a switch, a foot switch 5171, and/or a lever may be applied as the input device 5161. In a case where a touch panel is used as the input device 5161, the touch panel may be provided on a display surface of the display device 5155.

Alternatively, the input device 5161 is a device mounted by a user such as a spectacle-type wearable device or a head mounted display (HMD), and various inputs are performed in response to the user's gesture or eye gaze detected by these devices. In addition, the input device 5161 includes a camera capable of detecting the movement of the user, and various inputs are performed in response to the user's gesture or eye gaze detected from a video captured by the camera. Furthermore, the input device 5161 includes a microphone capable of collecting a user's voice, and various inputs are performed in response to a sound through the microphone. In this manner, the input device 5161 is configured to be able to input various information in a non-contact manner, so that a user particularly belonging to a clean area (for example, the surgeon 5181) can operate a device belonging to a dirty area in a non-contact manner. In addition, the user can operate the device without taking his or her hand off an operation tool held by the user, and thus the convenience of the user is improved.

A treatment tool control device 5163 controls the driving of the energy treatment tool 5135 for cauterizing, incising of tissues, or sealing of blood vessels. An aeroperitoneum device 5165 sends gas into the body cavity of the patient 5185 through the pneumoperitoneum tube 5133 in order to inflate the body cavity for the purpose of securing a field of view and securing a surgeon's working space by the endoscope 5115. The recorder 5167 is a device capable of recording various information on a surgical operation. A printer 5169 is a device capable of printing various information on a surgical operation in various forms such as text, an image, or a graph.

Hereinafter, a particularly characteristic configuration of the endoscope surgical operation system 5113 will be described in more detail.

(Supporting Arm Device)

The supporting arm device 5141 includes a base portion 5143 which is a base, and an arm portion 5145 extending from the base portion 5143. In an example shown in the drawing, the arm portion 5145 is constituted by a plurality of joint portions 5147a, 5147b, and 5147c and a plurality of links 5149a and 5149b connected to each other by the joint portion 5147b, but a configuration of the arm portion 5145 is simplified and shown in FIG. 14 for the purpose of simplification. Actually, the shapes, numbers, and arrangement of the joint portions 5147a to 5147c and the links 5149a and 5149b, the direction of rotation axes of the joint portions 5147a to 5147c, and the like may be appropriately set so that the arm portion 5145 has a desired degree of freedom. For example, the arm portion 5145 may be configured to suitably have a degree of freedom of 6 or more. Thereby, the endoscope 5115 can be freely moved within a variable range of the arm portion 5145, and thus it is possible to insert the lens-barrel 5117 of the endoscope 5115 into the body cavity of the patient 5185 from a desired direction.

An actuator is provided in the joint portions 5147a to 5147c, and the joint portions 5147a to 5147c are configured to be rotatable about a predetermined rotation axis in association with the driving of the actuator. The driving of the actuator is controlled by the arm control device 5159, the rotation angles of the joint portions 5147a to 5147c are controlled, and the driving of the arm portion 5145 is controlled. Thereby, the control of the position and posture of the endoscope 5115 may be realized. At this time, the arm control device 5159 can control the driving of the arm portion 5145 by various known control methods such as power control or position control.

For example, when the surgeon 5181 appropriately performs an operation input through the input device 5161 (including the foot switch 5171), the driving of the arm portion 5145 may be appropriately controlled by the arm control device 5159 in response to the operation input, and the position and posture of the endoscope 5115 may be controlled. The endoscope 5115 at the tip end of the arm portion 5145 is moved from any position to any position through the controlling, and then can be fixedly supported at the moved position. Meanwhile, the arm portion 5145 may be operated by a so-called mater-slave method. In this case, the arm portion 5145 may be remotely operated by a user through the input device 5161 installed at a place separated from a surgical operating room.

Furthermore, in a case where power control is applied, the arm control device 5159 may receive an external force from a user and may perform so-called power assist control for driving actuators of the joint portions 5147a to 5147c so that the arm portion 5145 moves smoothly in response to the external force. Thereby, the user can move the arm portion 5145 with a relatively small force at the time of moving the arm portion 5145 while directly touching the arm portion 5145. Thus, it is possible to more intuitively move the endoscope 5115 with a simpler operation and improve the convenience of the user.

Here, generally, in an endoscopic surgical operation, the endoscope 5115 is supported by a doctor called a scopist. On the other hand, since the position of the endoscope 5115 can be fixed more firmly without depending on a human hand by using the supporting arm device 5141, it is possible to stably obtain an image of an operation part and smoothly perform a surgical operation.

Meanwhile, the arm control device 5159 may not be necessarily provided in the cart 5151. In addition, the arm control device 5159 may not be necessarily one device. For example, the arm control device 5159 may be provided in each of the joint portions 5147a to 5147c of the arm portion 5145 of the supporting arm device 5141, and driving control of the arm portion 5145 may be realized by cooperation of the plurality of arm control devices 5159.

(Light Source Device)

The light source device 5157 supplies irradiation light used at the time of imaging an operation part to the endoscope 5115. The light source device 5157 is constituted by a white light source constituted by, for example, an LED, a laser light source, or a combination thereof. At this time, in a case where the white light source is constituted by a combination of RGB laser light sources, the intensity and timing of output of each color (each wavelength) can be controlled with high accuracy, and thus it is possible to adjust white balance of a captured image in the light source device 5157. Furthermore, in this case, an observation target is irradiated with a laser beam from each of the RGB laser light sources in a time-division manner, and the driving of an imaging element of the camera head 5119 is controlled in synchronization with the irradiation timing, whereby it is also possible to capture an image corresponding to each of RGB in a time-division manner. According to the method, it is possible to obtain a color image without providing a color filter in the imaging element.

In addition, the driving of the light source device 5157 may be controlled so as to change the intensity of light to be output at predetermined time intervals. The driving of the imaging element of the camera head 5119 is controlled in synchronization with a timing at which the intensity of the light is changed to acquire an image in a time-division manner, and the image is combined, whereby it is possible to generate a high dynamic range image having no so-called blackout and blurring.

In addition, the light source device 5157 may be configured to be able to supply light in a predetermined wavelength band corresponding to special light observation. In the special light observation, for example, light in a band narrower than that of irradiation light (that is, white light) at the time of normal observation is emitted using wavelength dependency of light absorption in body tissues, and thus so-called narrow band imaging for imaging a predetermined tissue such as a blood vessel on a surface layer of mucous membrane with high contrast is performed. Alternatively, in the special light observation, fluorescence observation for obtaining an image by fluorescence generated by emitting excitation light may be performed. In the fluorescent observation, a body tissue may be irradiated with excitation light to observe fluorescence from the body tissue (autofluorescence observation), or a reagent such as indocyanine green (ICG) may be locally injected into the body tissue, and the body tissue may be irradiated with excitation light corresponding to a fluorescence wavelength of the reagent to obtain a fluorescence image. The light source device 5157 may be configured to be able to supply narrow band light and/or excitation light corresponding to such special light observation.

(Camera Head and CCU)

Figure 15:
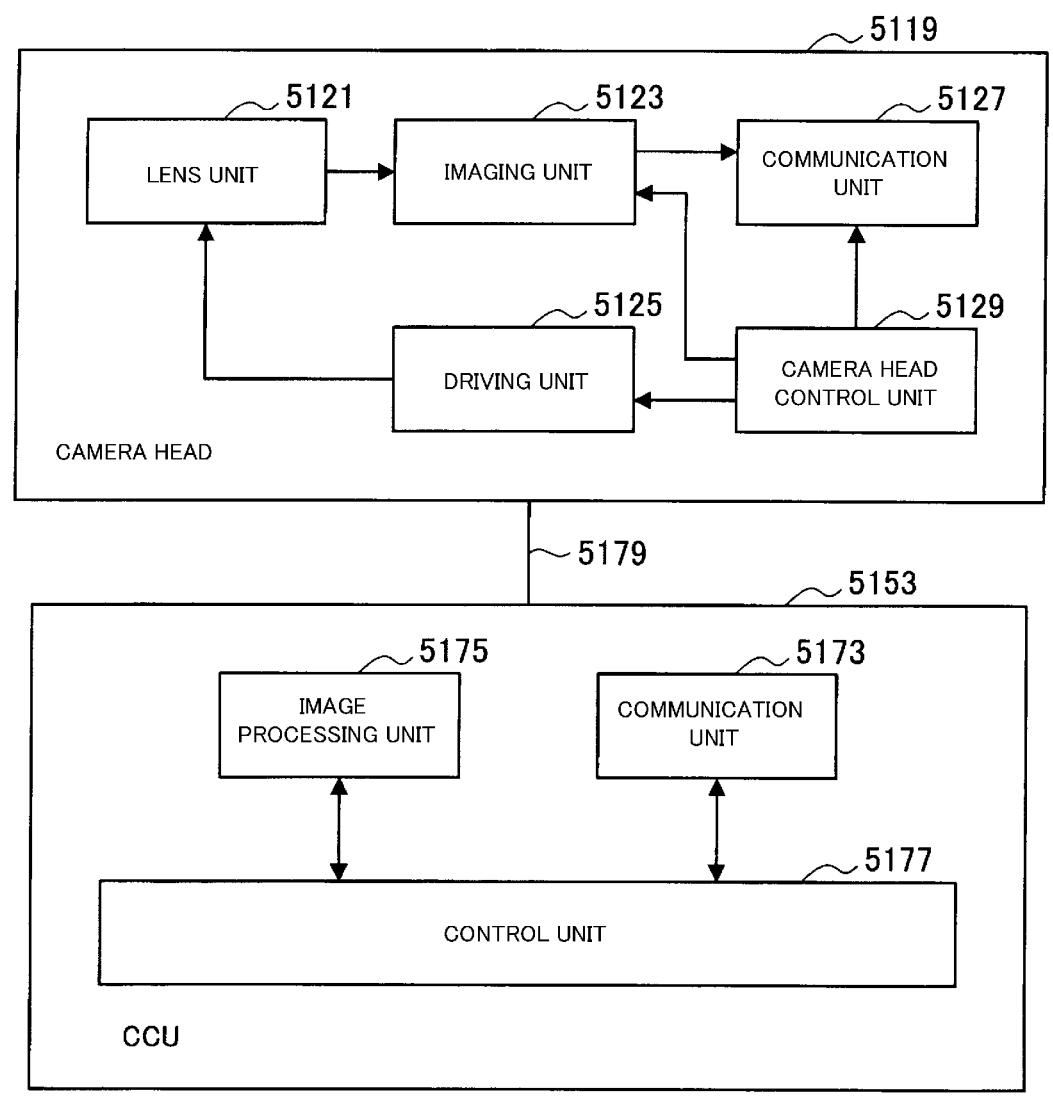
FIG. 15 is a diagram showing an example of functional configurations of a camera head and a CCU shown in FIG. 14.

Functions of the camera head 5119 of the endoscope 5115 and the CCU 5153 will be described in more detail with reference to FIG. 15. FIG. 15 is a block diagram showing an example of functional configurations of the camera head 5119 and the CCU 5153 shown in FIG. 14.

Referring to FIG. 15, the camera head 5119 includes a lens unit 5121, an imaging unit 5123, a driving unit 5125, a communication unit 5127, and a camera head control unit 5129 as the functions thereof. In addition, the CCU 5153 includes a communication unit 5173, an image processing unit 5175, and a control unit 5177 as the functions thereof. The camera head 5119 and the CCU 5153 are connected to each other by a transmission cable 5179 so as to be able to communicate with each other bidirectionally.

First, a functional configuration of the camera head 5119 will be described. The lens unit 5121 is an optical system provided in a connection portion with respect to the lens-barrel 5117. Observation light taken in from the top end of the lens-barrel 5117 is guided to the camera head 5119 and is incident on the lens unit 5121. The lens unit 5121 is constituted by a combination of a plurality of lenses including a zoom lens and a focus lens. Optical characteristics of the lens unit 5121 are adjusted so that observation light is condensed on a light receiving surface of an imaging element of the imaging unit 5123. In addition, the zoom lens and the focus lens are configured such that the positions thereof on the optical axes are movable in order to adjust the magnification and focus of a captured image.

The imaging unit 5123 is constituted by an imaging element and is disposed at a rear stage of the lens unit 5121. Observation light having passed through the lens unit 5121 is condensed on a light receiving surface of the imaging element, and an image signal corresponding to an observation image is generated by photoelectric conversion. The image signal generated by the imaging unit 5123 is provided to the communication unit 5127.

The imaging element constituting the imaging unit 5123 is, for example, a complementary metal oxide semiconductor (CMOS) type image sensor, and an imaging element, having a Bayer array, which is capable of performing color imaging is used. Meanwhile, as the imaging element, for example, an imaging element capable of coping with the capture of a high-resolution image of 4 K or more may be used. An image of an operation part is obtained with a high resolution, and thus the surgeon 5181 can ascertain the state of the operation part in more detail and can proceed a surgical operation more smoothly.

In addition, the imaging element constituting the imaging unit 5123 is configured to include a pair of imaging elements for respectively acquiring image signals for right and left eyes corresponding to 3D display. When 3D display is performed, the surgeon 5181 can more accurately ascertain the depth of biological tissues in an operation part. Meanwhile, in a case where the imaging unit 5123 is configured in a multi-plate type, a plurality of systems of the lens units 5121 are also provided in response to the imaging elements.

In addition, the imaging unit 5123 may not be necessarily provided in the camera head 5119. For example, the imaging unit 5123 may be provided immediately after the object lens inside the lens-barrel 5117.

The driving unit 5125, which is constituted by an actuator, moves the zoom lens and the focus lens of the lens units 5121 by a predetermined distance along an optical axis under the control of the camera head control unit 5129. Thereby, the magnification and focus of a captured image obtained by the imaging unit 5123 may be appropriately adjusted.

The communication unit 5127 is constituted by a communication device for transmitting and receiving various information to and from the CCU 5153. The communication unit 5127 transmits an image signal obtained from the imaging unit 5123 to the CCU 5153 through the transmission cable 5179 as RAW data. In this case, it is preferable that the image signal be transmitted through optical communication in order to display a captured image of the operation part with low latency. This is because the surgeon 5181 performs a surgical operation while observing the state of an affected part using a captured image during the surgical operation, and thus it is required that a moving image of an operation part is displayed in real time as much as possible in order to perform a more safe and reliable surgical operation. In a case where optical communication is performed, the communication unit 5127 is provided with a photoelectric conversion module that converts an electrical signal into an optical signal. An image signal is converted into an optical signal by the photoelectric conversion module and is then transmitted to the CCU 5153 through the transmission cable 5179.

In addition, the communication unit 5127 receives a control signal for controlling the driving of the camera head 5119 from the CCU 5153. The control signal includes information on imaging conditions such as information indicating that a frame rate of a captured image is designated, information indicating that an exposure value during imaging is designated, and/or information indicating that the magnification and focus of a captured image are designated. The communication unit 5127 provides the received control signal to the camera head control unit 5129. Meanwhile, a control signal received from the CCU 5153 may also be transmitted through optical communication. In this case, the communication unit 5127 is provided with a photoelectric conversion module that converts an optical signal into an electrical signal, and a control signal is converted into an electrical signal by the photoelectric conversion module and is then provided to the camera head control unit 5129.

Meanwhile, the above-described imaging conditions such as a frame rate, an exposure value, magnification, and a focus are automatically set by the control unit 5177 of the CCU 5153 on the basis of an acquired image signal. That is, a so-called auto exposure (AE) function, an auto focus (AF) function, and an auto white balance (AWB) function are mounted on the endoscope 5115.

The camera head control unit 5129 controls the driving of the camera head 5119 on the basis of a control signal received from the CCU 5153 through the communication unit 5127. For example, the camera head control unit 5129 controls the driving of an imaging element of the imaging unit 5123 on the basis of information indicating that a frame rate of a captured image is designated and/or information indicating that exposure during imaging is designated. In addition, for example, the camera head control unit 5129 appropriately moves the zoom lens and the focus lens of the lens unit 5121 through the driving unit 5125 on the basis of information indicating that the magnification and focus of a captured image are designated. The camera head control unit 5129 may further have a function of storing information for identifying the lens-barrel 5117 and the camera head 5119.

Meanwhile, components such as the lens unit 5121 and the imaging unit 5123 are disposed in a sealed structure with high airtightness and waterproofness, and thus the camera head 5119 can be made resistant to autoclave sterilization.

Next, a functional configuration of the CCU 5153 will be described. The communication unit 5173 is constituted by a communication device for transmitting and receiving various information to and from the camera head 5119. The communication unit 5173 receives an image signal transmitted from the camera head 5119 through the transmission cable 5179. At this time, as described above, the image signal may be suitably transmitted through optical communication. In this case, the communication unit 5173 is provided with a photoelectric conversion module that converts an optical signal into an electrical signal in response to optical communication. The communication unit 5173 provides an image signal converted into an electrical signal to the image processing unit 5175.

In addition, the communication unit 5173 transmits a control signal for controlling the driving of the camera head 5119 to the camera head 5119. The control signal may also be transmitted through optical communication.

The image processing unit 5175 performs various image processing on an image signal which is RAW data transmitted from the camera head 5119. Examples of the image processing include various known signal processing such as development processing, high image quality processing (band emphasis processing, super resolution processing, noise reduction (NR) processing, and/or camera shake correction processing), and/or enlargement processing (electronic zoom processing). In addition, the image processing unit 5175 performs detection processing for an image signal for performing AE, AF, and AWB.

The image processing unit 5175 is constituted by a processor such as a CPU or a GPU, and the above-described image processing and detection processing may be performed by the processor operating in accordance with a predetermined program. Meanwhile, in a case where the image processing unit 5175 is constituted by a plurality of GPUs, the image processing unit 5175 appropriately divides information regarding an image signal and performs image processing by the plurality of GPUs in parallel.

The control unit 5177 performs imaging of an operation part by the endoscope 5115 and a variety of controls related to the display of a captured image thereof. For example, the control unit 5177 generates a control signal for controlling the driving of the camera head 5119. At this time, in a case where imaging conditions are input by a user, the control unit 5177 generates a control signal on the basis of the user's input. Alternatively, in a case where the endoscope 5115 is equipped with an AE function, an AF function, and an AWB function, the control unit 5177 appropriately calculates an optimal exposure value, focal distance, and white balance in accordance with results of the detection processing performed by the image processing unit 5175 to generate a control signal.

In addition, the control unit 5177 displays an image of an operation part on the display device 5155 on the basis of an image signal on which image processing is performed by the image processing unit 5175. At this time, the control unit 5177 recognizes various objects in an operation part image using various image recognition techniques. For example, the control unit 5177 can recognize surgical tools such as a forceps, a specific biological part, bleeding, mist during the use of the energy treatment tool 5135, and the like by detecting the shape, color, and the like of an edge of an object included in an operation part image. When the control unit 5177 displays an image of an operation part on the display device 5155, the control unit 5177 displays various surgical operation supporting information so as to be superimposed on the image of the operation part using the recognition results. The surgical operation supporting information is displayed so as to be superimposed and is presented to the surgeon 5181, and thus it is possible to proceed with a surgical operation more safely and reliably.

The transmission cable 5179 for connecting the camera head 5119 and the CCU 5153 is an electric signal cable that supports electric signal communication, an optical fiber that supports optical communication, or a composite cable thereof.

Here, in an example shown in the drawing, communication is performed in a wired manner using the transmission cable 5179, but communication between the camera head 5119 and the CCU 5153 may be performed in a wireless manner. In a case where communication therebetween is performed in a wireless manner, it is not necessary to lay the transmission cable 5179 in a surgical operating room, and thus a situation where the movement of a medical staff in the surgical operating room is hindered by the transmission cable 5179 can be eliminated.

An example of the operating room system 5100 to which the technology according to the present disclosure can be applied has been described above. Meanwhile, here, a case where a medical system to which the operating room system 5100 is applied is the endoscope surgical operation system 5113 has been described as an example, but a configuration of the operating room system 5100 is not limited to such an example. For example, the operating room system 5100 may be applied to an examination flexible endoscopic system or a microscopic operation system instead of the endoscope surgical operation system 5113.

The technology according to the present disclosure can be suitably applied to the ceiling camera 5187, the operation place camera 5189, and the endoscope among the above-described components. Specifically, the technology according to the present disclosure can be applied to imaging devices which are the cameras and the endoscope, and variable focal distance lens systems in these imaging devices. A clearer operation part image can be obtained by applying the technology according to the present disclosure to the cameras and the endoscope.

Application Example 2

The technology according to the present disclosure can be applied to various products. For example, the technology according to the present disclosure may be applied to an imaging device or a variable focal distance lens system mounted on a mobile body of any one type such as an automobile, an electric vehicle, a hybrid electric vehicle, a motorcycle, a bicycle, a personal mobility, an airplane, a drone, a ship, a robot, construction machinery, or agricultural machinery (tractor).

Figure 16:
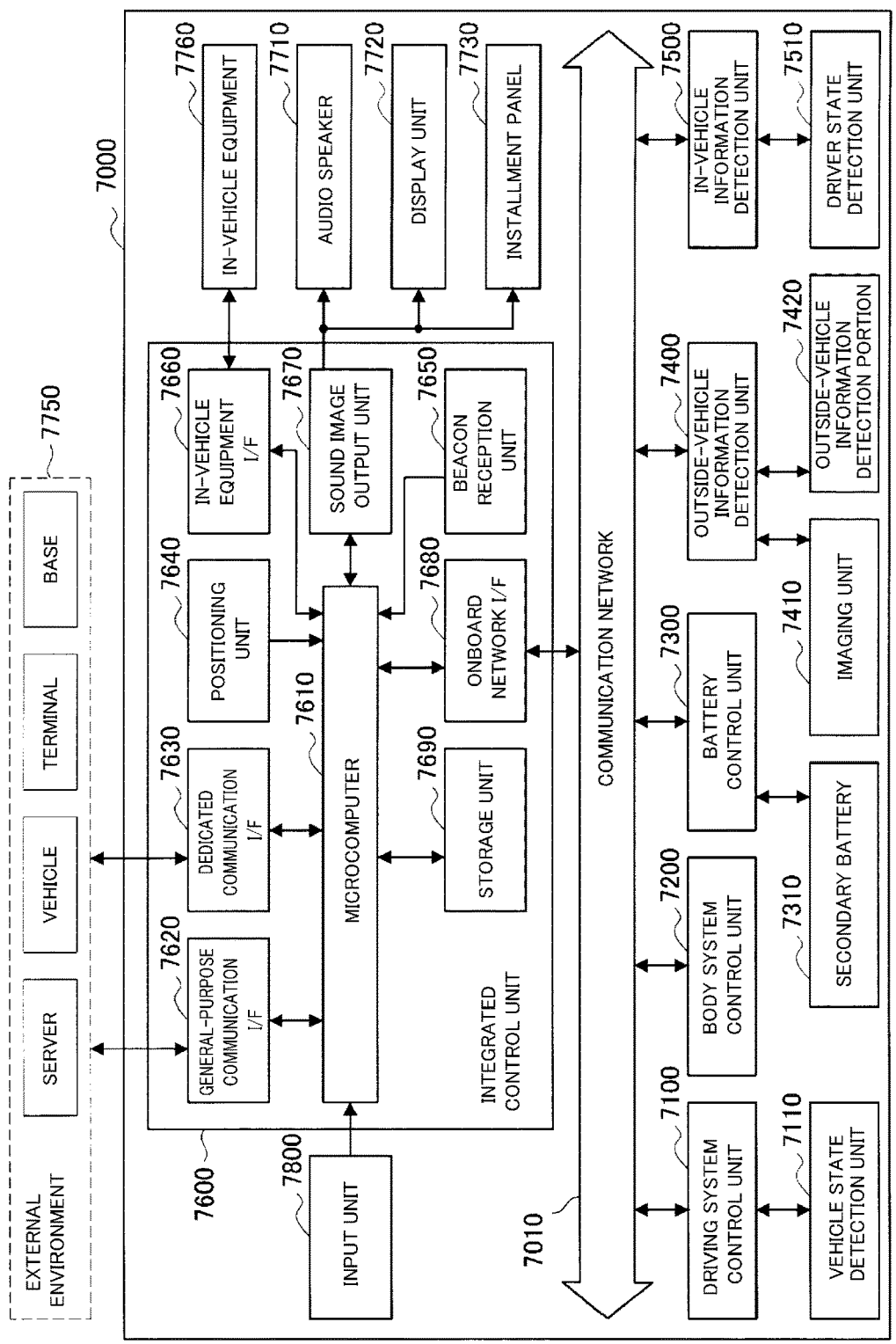
FIG. 16 is a block diagram showing an example of a schematic configuration of a vehicle control system.

FIG. 16 is a block diagram showing a schematic configuration example of a vehicle control system 7000 which is an example of a mobile body control system to which the technology according to the present disclosure can be applied. The vehicle control system 7000 includes a plurality of electronic control units connected to each other through a communication network 7010. In the example shown in FIG. 16, the vehicle control system 7000 includes a driving system control unit 7100, a body system control unit 7200, a battery control unit 7300, an outside-vehicle information detection unit 7400, an in-vehicle information detection unit 7500, and an integrated control unit 7600. The communication network 7010 for connecting these plurality of control units may be an onboard communication network based on any standard such as a controller area network (CAN), a local interconnect network (LIN), a local area network (LAN), or FlexRay (registered trademark).

The control units include a microcomputer that performs arithmetic processing in accordance with various programs, a storage unit that stores programs executed by the microcomputer, parameters used for various arithmetic operations, and the like, and a driving circuit that drives a device to be subjected to a variety of controls. Each of the control units includes a network I/F for performing communication with another control unit through the communication network 7010, and includes a communication I/F for performing communication with a device, a sensor, or the like inside or outside the vehicle by wired communication or wireless communication. In FIG. 16, a microcomputer 7610, a general-purpose communication I/F 7620, a dedicated communication I/F 7630, a positioning unit 7640, a beacon reception unit 7650, an in-vehicle equipment I/F 7660, a sound image output unit 7670, an onboard network I/F 7680, and a storage unit 7690 are shown as a functional configuration of the integrated control unit 7600. Similarly, the other control units also include a microcomputer, a communication I/F, a storage unit, and the like.

The driving system control unit 7100 controls the operation of a device related to a driving system of the vehicle in accordance with various programs. For example, the driving system control unit 7100 functions as control devices such as a driving force generation device for generating a driving force of the vehicle such as an internal-combustion engine or a driving motor, a driving force transmission mechanism for transmitting a driving force to wheels, a steering mechanism for adjusting a steering angle of the vehicle, and a braking device for generating a braking force of the vehicle. The driving system control unit 7100 may have a function as a control device such as an antilock brake system (ABS) or electronic stability control (ESC).

A vehicle state detection unit 7110 is connected to the driving system control unit 7100. The vehicle state detection unit 7110 includes at least one of, for example, a gyro sensor that detects an angular velocity of axial rotation of the vehicle body, an acceleration sensor that detects the acceleration of the vehicle, and a sensor for detecting the amount of operation of an accelerator pedal, the amount of operation of a brake pedal, a steering angle of a steering wheel, an engine speed, or a wheel rotation speed. The driving system control unit 7100 performs arithmetic processing using a signal input from the vehicle state detection unit 7110 and controls an internal-combustion engine, a driving motor, an electric power steering device, a brake device, or the like.

The body system control unit 7200 controls operations of various devices mounted on the vehicle body in accordance with various programs. For example, the body system control unit 7200 functions as a control device for a keyless entry system, a smart key system, a power window device, or various lamps such as a head lamp, a back lamp, a brake lamp, a blinker, and a fog lamp. In this case, radio waves transmitted from a portable device that substitutes for a key, or signals of various switches may be input to the body system control unit 7200. The body system control unit 7200 receives inputs of the radio waves or the signals and controls a door lock device, a power window device, a lamp, and the like of the vehicle.

The battery control unit 7300 controls a secondary battery 7310 which is a power supply source of a driving motor in accordance with various programs. For example, information such as the temperature, output voltage, and remaining capacity of a battery is input to the battery control unit 7300 from a battery device including the secondary battery 7310. The battery control unit 7300 performs arithmetic processing using these signals and performs temperature adjustment control of the secondary battery 7310 and control of a cooling device included in the battery device, or the like.

The outside-vehicle information detection unit 7400 detects external information of a vehicle having the vehicle control system 7000 mounted thereon. For example, at least one of an imaging unit 7410 and an outside-vehicle information detection portion 7420 is connected to the outside-vehicle information detection unit 7400. The imaging unit 7410 includes at least one of a time of flight (ToF) camera, a stereo camera, a monocular camera, an infrared camera, and other cameras. The outside-vehicle information detection portion 7420 includes at least one of, for example, an environmental sensor for detecting the current weather or weather conditions and a surrounding information detection sensor for detecting other vehicles, obstacles, pedestrians, and the like around the vehicle having the vehicle control system 7000 mounted thereon.

The environmental sensor may be, for example, at least one of a raindrop sensor that detects rainy weather, a fog sensor that detects fog, a sunshine sensor that detects the degree of sunshine, and a snow sensor that detects snowfall. The surroundings information detection sensor may be at least one of an ultrasonic sensor, a radar device, and a light detection and ranging, laser imaging detection and ranging (LIDAR) device. The imaging unit 7410 and the outside-vehicle information detection portion 7420 may be provided as independent sensors or devices or may be provided as a device in which a plurality of sensors or devices are integrated.

Figure 17:
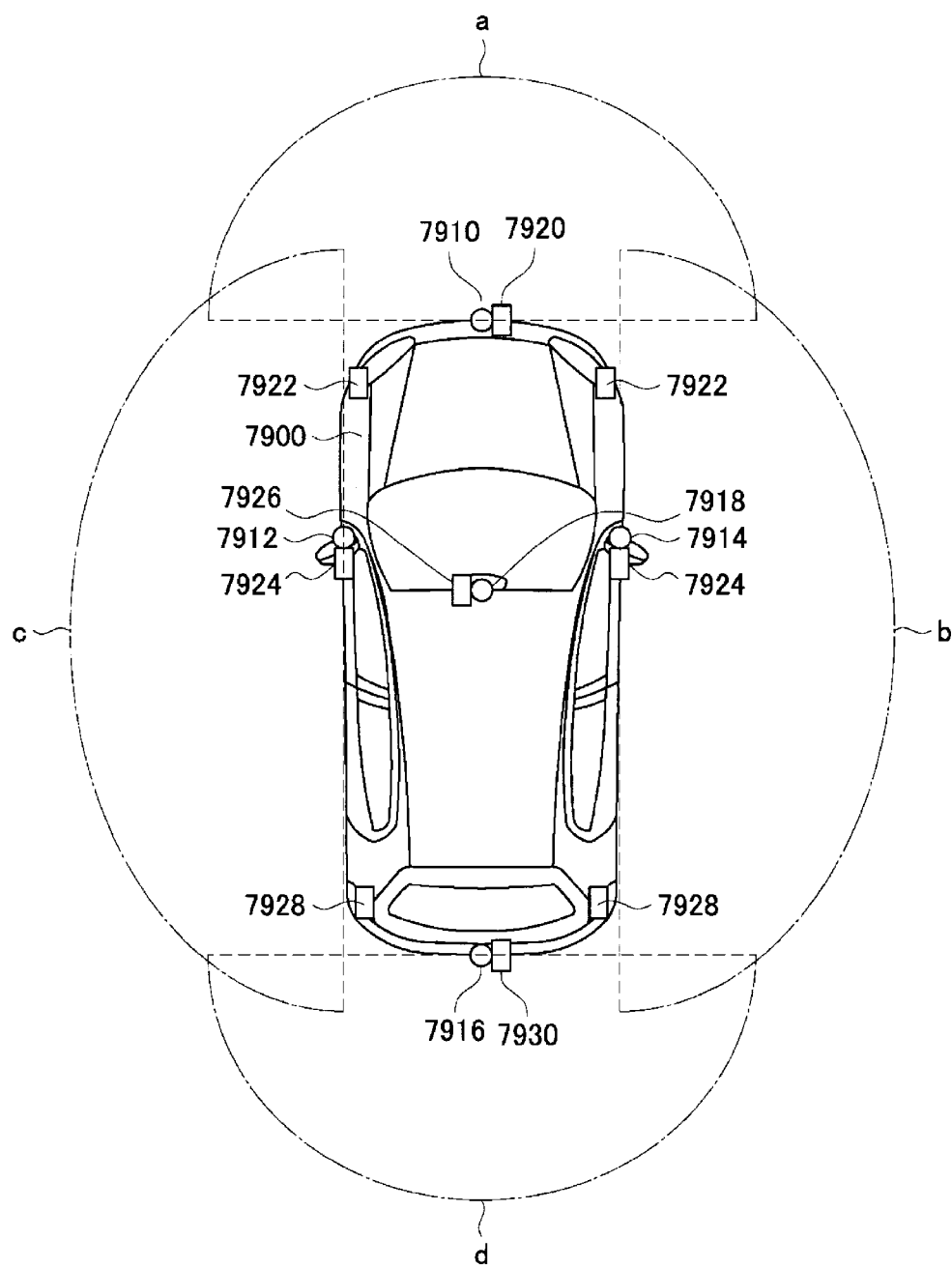
FIG. 17 is a diagram showing an example of installation positions of an outside-vehicle information detection portion and an imaging unit.

Here, FIG. 17 shows an example of installation positions of the imaging unit 7410 and the outside-vehicle information detection portion 7420. The imaging units 7910, 7912, 7914, 7916, and 7918 are provided, for example, at least one position among the front nose, side mirrors, rear bumper, and back door of the vehicle 7900 and the upper part of the windshield inside the vehicle. The imaging unit 7910 provided at the front nose and the imaging unit 7918 provided on the upper part of the windshield inside the vehicle mainly acquire an image of a position in front of the vehicle 7900. The imaging units 7912 and 7914 provided at the side mirrors mainly acquire an image of a position on the side of the vehicle 7900. The imaging unit 7916 provided at the rear bumper or the back door mainly acquires an image of a position behind the vehicle 7900. The imaging unit 7918 provided on the upper part of the windshield inside the vehicle is mainly used to detect vehicles in front of the vehicle, pedestrians, obstacles, traffic lights, traffic signs, lanes, or the like.

Meanwhile, FIG. 17 shows an example of imaging ranges of the imaging units 7910, 7912, 7914, and 7916. An imaging range a indicates an imaging range of the imaging unit 7910 provided at the front nose, imaging ranges b and c indicate imaging ranges of the imaging units 7912 and 7914 provided at the side mirrors, and an imaging range d indicates an imaging range of the imaging unit 7916 pro-vided at the rear bumper or the back door. For example, pieces of image data captured by the imaging units 7910, 7912, 7914, and 7916 are superimposed on each other, and thus a bird's-eye view image of the vehicle 7900 when seen from above is obtained.

Outside-vehicle information detection portions 7920, 7922, 7924, 7926, 7928, and 7930 provided at the front, rear, side, and corner of the vehicle 7900 and the upper part of the windshield inside the vehicle may be, for example, an ultrasonic sensor or a radar device. The outside-vehicle information detection portions 7920, 7926, and 7930 provided at the front nose, rear bumper, and back door of the vehicle 7900 and the upper part of the windshield inside the vehicle may be, for example, a LIDAR device. These outside-vehicle information detection portions 7920 to 7930 are mainly used to detect vehicles in front of the vehicle, pedestrians, obstacles, or the like.

Description will be continued referring back to FIG. 16. The outside-vehicle information detection unit 7400 causes the imaging unit 7410 to capture an image of an outside vehicle and receives captured image data. In addition, the outside-vehicle information detection unit 7400 receives detection information from the outside-vehicle information detection portion 7420 connected thereto. In a case where the outside-vehicle information detection portion 7420 is an ultrasonic sensor, a radar device, or a LIDAR device, the outside-vehicle information detection unit 7400 transmits ultrasonic waves, electromagnetic waves, or the like and receives information of received reflected waves. The outside-vehicle information detection unit 7400 may perform detection processing for an object such as people, cars, obstacles, signs, or letters on a road, or distance detection processing on the basis of the received information. The outside-vehicle information detection unit 7400 may perform environment recognition processing for recognizing rainfall, fog, road surface conditions, or the like on the basis of the received information. The outside-vehicle information detection unit 7400 may calculate a distance to an object outside the vehicle on the basis of the received information.

In addition, the outside-vehicle information detection unit 7400 may perform image recognition processing for recognizing people, cars, obstacles, signs, or letters on a road, or distance detection processing on the basis of received image data. The outside-vehicle information detection unit 7400 may perform processing such as distortion correction or alignment on the received image data, and may synthesize image data captured by different imaging units 7410 to generate a bird's-eye view image or a panoramic image. The outside-vehicle information detection unit 7400 may perform viewpoint conversion processing using image data captured by the different imaging units 7410.

The in-vehicle information detection unit 7500 detects information inside the vehicle. For example, a driver state detection unit 7510 that detects the state of a driver is connected to the in-vehicle information detection unit 7500. The driver state detection unit 7510 may include a camera that images a driver, a biological sensor that detects biological information of a driver, a microphone that collects sound inside the vehicle, or the like. The biological sensor is provided, for example, on a seat surface, a steering wheel, or the like, and detects biological information of an occupant sitting on a seat or a driver holding a steering wheel. The in-vehicle information detection unit 7500 may calculate the degree of fatigue or degree of concentration of a driver on the basis of detection information input from the driver state detection unit 7510, and may determine whether or not a driver falls asleep. The in-vehicle information detection unit 7500 may perform processing such as noise cancelling processing on a collected sound signal.

The integrated control unit 7600 controls the overall operation in the vehicle control system 7000 in accordance with various programs. An input unit 7800 is connected to the integrated control unit 7600. The input unit 7800 is realized by a device on which an occupant can perform an input operation, such as a touch panel, a button, a microphone, a switch, or a lever. Data obtained by recognizing sound input through a microphone may be input to the integrated control unit 7600. The input unit 7800 may be, for example, a remote control device using infrared rays or other radio waves, or may be external connection equipment such as a mobile phone or a personal digital assistant (PDA) corresponding to an operation of the vehicle control system 7000. The input unit 7800 may be, for example, a camera, and in this case, an occupant can input information by a gesture. Alternatively, data obtained by detecting the movement of a wearable device worn on an occupant may be input. Further, the input unit 7800 may include, for example, an input control circuit that generates an input signal on the basis of information input by an occupant or the like using the input unit 7800 mentioned above and outputs the input signal to the integrated control unit 7600. The occupant or the like inputs various data to the vehicle control system 7000 by operating the input unit 7800 or gives an instruction for a processing operation.

The storage unit 7690 may include a read only memory (ROM) that stores various programs executed by a microcomputer, and a random access memory (RAM) that stores various parameters, arithmetic results, sensor values, or the like. In addition, the storage unit 7690 may be realized by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various equipment present in the external environment 7750. The general-purpose communication I/F 7620 may be equipped with a cellular communication protocol such as a global system of mobile communications (GSM, registered trademark), WiMAX (registered trademark), long term evolution (LTE, registered trademark), or LTE-advanced (LTE-A), or other wireless communication protocols such as a wireless LAN (also referred to as Wi-Fi (registered trademark)) or Bluetooth (registered trademark). The general-purpose communication I/F 7620 may be connected to equipment (for example, an application server or a control server) which is present on an external network (for example, the Internet, a cloud network, or a company-specific network) through, for example, a base station or an access point. In addition, the general-purpose communication I/F 7620 may be connected to a terminal (for example, a terminal of a driver, a pedestrian, or a store, or a machine type communication (MTC) terminal) which is present in the vicinity of a vehicle using, for example, a peer to peer (P2P) technique.

The dedicated communication I/F 7630 is a communication I/F that supports a communication protocol designed for use in vehicles. The dedicated communication I/F 7630 may be equipped with a standard protocol such as a wireless access in vehicle environment (WAVE) which is a combination of IEEE 802.11p of a lower layer and IEEE 1609 of an upper layer, dedicated short range communications (DSRC), or a cellular communication protocol. The dedicated communication I/F 7630 typically performs V2X communication which is a concept including one or more of vehicle to vehicle communication, vehicle to infrastructure communication, vehicle to home communication, and vehicle to pedestrian communication.

The positioning unit 7640 receives, for example, a GNSS signal from a global navigation satellite system (GNSS) satellite (for example, a GPS signal from a global positioning system (GPS) satellite) to execute positioning, and generates positional information including the latitude, longitude, and altitude of a vehicle. Meanwhile, the positioning unit 7640 may specify the current position by exchanging signals with a wireless access point, or may acquire positional information from a terminal such as a mobile phone, a PHS, or a smartphone having a positioning function.

The beacon reception unit 7650 receives radio waves or electromagnetic waves transmitted from, for example, a radio station or the like installed on a road, and acquires information such as a current position, a traffic jam, road closure, or a required time. Meanwhile, the function of the beacon reception unit 7650 may be included in the dedicated communication I/F 7630 mentioned above.

The in-vehicle equipment I/F 7660 is a communication interface that mediates connection between the microcomputer 7610 and various in-vehicle equipment 7760 present inside a vehicle. The in-vehicle equipment I/F 7660 may establish wireless connection using a wireless communication protocol such as a wireless LAN, Bluetooth (registered trademark), near field communication (NFC), or a wireless USB (WUSB). In addition, the in-vehicle equipment I/F 7660 may establish wired connection such as a universal serial bus (USB), a high-definition multimedia interface (HDMI, registered trademark), or a mobile high-definition link (MHL) through a connection terminal not shown in the drawing (and a cable if necessary). The in-vehicle equipment 7760 may include at least one of, for example, a mobile equipment or a wearable equipment held by an occupant, and an information equipment carried into or attached to a vehicle. In addition, the in-vehicle equipment 7760 may include a navigation device for searching for a route to any destination. The in-vehicle equipment I/F 7660 exchanges a control signal or a data signal with the in-vehicle equipment 7760.

The onboard network I/F 7680 is an interface that mediates communication between the microcomputer 7610 and the communication network 7010. The onboard network I/F 7680 transmits and receives signals or the like in accordance with a predetermined protocol supported by the communication network 7010.

The microcomputer 7610 of the integrated control unit 7600 controls the vehicle control system 7000 in accordance with various programs on the basis of information acquired through at least one of the general-purpose communication I/F 7620, the dedicated communication I/F 7630, the positioning unit 7640, the beacon reception unit 7650, the in-vehicle equipment I/F 7660, and the onboard network I/F 7680. For example, the microcomputer 7610 may arithmetically operate a control target value of the driving force generation device, the steering mechanism, or the braking device on the basis of acquired information on the inside and outside of the vehicle, and may output a control instruction to the driving system control unit 7100. For example, the microcomputer 7610 may perform cooperative control for the purpose of realizing an advanced driver assistance system (ADAS) function including vehicle collision avoidance or vehicle collision alleviation, follow-up driving based on a vehicle-to-vehicle distance, vehicle speed maintenance driving, a vehicle collision warning, a vehicle lane deviation warning, and the like. In addition, the microcomputer 7610 may perform cooperative control for the purpose of automatic driving for performing autonomous driving without depending on a driver's operation by controlling the driving force generation device, the steering mechanism, the braking device, or the like on the basis of acquired information on the surroundings of the vehicle.

The microcomputer 7610 may generate information on a three-dimensional distance between a vehicle and an object such as a surrounding structure or a person on the basis of information acquired through at least one among the general-purpose communication I/F 7620, the dedicated communication I/F 7630, the positioning unit 7640, the beacon reception unit 7650, the in-vehicle equipment I/F 7660, and the onboard network I/F 7680, and may create local map information including surrounding information of the current position of the vehicle. In addition, the microcomputer 7610 may predict danger such as a vehicle collision or a pedestrian or the like approaching or entering a closed road on the basis of acquired information, and may generate a warning signal. For example, the warning signal is a signal for generating a warning sound or turning on a warning lamp.

The sound image output unit 7670 transmits an output signal of at least one of a sound and an image to an output device capable of visually or aurally notifying an occupant of a vehicle or the outside of the vehicle of information. In the example of FIG. 16, an audio speaker 7710, a display unit 7720, and an installment panel 7730 are shown as output devices. The display unit 7720 may include at least one of, for example, an onboard display and a head-up display. The display unit 7720 may have an augmented reality (AR) display function. The output devices may be devices other than these devices, for example, a headphone, a wearable device such as an eyeglass-type display worn on an occupant, a projector or a lamp. In a case where the output device is a display device, the display device visually displays results obtained through various processing performed by the microcomputer 7610 or information received from other control units in various forms such as text, an image, a table, and a graph. Further, in a case where the output device is a sound output device, the sound output device converts an audio signal constituted by reproduced sound data, acoustic data, or the like into an analog signal and aurally outputs the converted signal.

Meanwhile, in the example shown in FIG. 16, at least two control units connected to each other through the communication network 7010 may be integrated as one control unit. Alternatively, each of the control units may be constituted by a plurality of control units. Further, the vehicle control system 7000 may include another control unit not shown in the drawing. Further, in the above description, another control unit may have some or all of the functions carried by any one control unit. That is, when information is transmitted and received through the communication network 7010, predetermined arithmetic processing may be performed by any one control unit. Similarly, a sensor or a device connected to any one control unit may be connected to another control unit, and a plurality of control units may transmit and receive detection information to and from each other through the communication network 7010.

[The Present Technology]

The present technology can also be configured as follows.

<1>

A variable focal distance lens system including:

a first lens unit constituted by at least one lens group;

a second lens unit constituted by a first freeform-curved surface lens and a second freeform-curved surface lens; and a third lens unit constituted by at least one lens group, the variable focal distance lens system including the first to third lens units in this order from an object side to an image side, wherein the first lens unit and the third lens unit are constituted by a lens having a shape rotationally symmetrical to an optical axis and are disposed on the same optical axis, the first freeform-curved surface lens and the second freeform-curved surface lens are formed to have the same shape and are disposed to be rotated at 180 degrees about an optical axis, the first freeform-curved surface lens and the second freeform-curved surface lens are movable in a Y-axis direction when optical axes of the first lens unit and the third lens unit are set to be a Z-axis, an axis perpendicular to the Z-axis on an image surface is set to be a Y-axis, and an axis perpendicular to the Y-axis and the Z-axis on the image surface is set to be an X-axis, a refractive power of the second lens unit is variable due to the first freeform-curved surface lens and the second freeform-curved surface lens moving in opposite directions, and the first freeform-curved surface lens and the second freeform-curved surface lens are moved in the Y-axis direction in association with movement of some of lens groups constituting the first lens unit and the third lens unit when positional states of the lenses are changed from a wide-angle end state in which a focal distance is shortest to a telephoto end state in which a focal distance is longest.

<2>

The variable focal distance lens system according to <1>, wherein the following Conditional Expression (1) is satisfied.

$$0.03 < \Delta P2/Z < 0.35 \quad (1)$$

Here, $\Delta P2$: $\varphi 2T/\varphi 2W$ $\varphi 2T$: A refractive power of the second lens unit in a telephoto end state $\varphi 2W$: A refractive power of the second lens unit in a wide-angle end state Z: ft/fw ft: A focal distance of the entire lens system in a telephoto end state fw: A focal distance of the entire lens system in a wide-angle end state

<3>

The variable focal distance lens system according to <2>, wherein the following Conditional Expression (2) and Conditional Expression (3) are satisfied.

$$0.1 < |\Delta LA|/ft < 0.3 \quad (2)$$

$$0.1 < |\Delta LB|/ft < 0.3 \quad (3)$$

Here, $\Delta LA$: The amount of movement of the first freeform-curved surface lens in the Y-axis direction from a wide-angle end state to a telephoto end state $\Delta LB$: The amount of movement of the second freeform-curved surface lens in the Y-axis direction from a wide-angle end state to a telephoto end state ft: A focal distance of the entire lens system in a telephoto end state

<4>

The variable focal distance lens system according to <3>, wherein an aperture diaphragm is disposed in a vicinity of the second lens unit, and the following Conditional Expression (4) is satisfied.

$$|\Delta P|/fw < 0.7 \quad (4)$$

Here,

ΔP: A maximum value of a length along the Z-axis from the aperture diaphragm to the second lens unit fw: A focal distance of the entire lens system in a wide-angle end state

<5>

The variable focal distance lens system according to <4>, wherein the following Conditional Expression (5) is satisfied.

$$0.9 < |\Delta LA|/|\Delta LB| < 1.1 \quad (5)$$

Here,

ΔLA: The amount of movement of the first freeform-curved surface lens in the Y-axis direction from a wide-angle end state to a telephoto end state ΔLB: The amount of movement of the second freeform-curved surface lens in the Y-axis direction from a wide-angle end state to a telephoto end state

<6>

The variable focal distance lens system according to <5>, wherein the first lens unit includes a first lens group having a positive refractive power and a second lens group having a negative refractive power in this order from an object side to an image side, and at least the second lens group is moved in an optical axis direction so that an interval between the first lens group and the second lens group is increased and an interval between the second lens group and the second lens unit is decreased when positional states of the lenses change from a wide-angle end state to a telephoto end state.

<7>

The variable focal distance lens system according to <6>, wherein the third lens unit includes a focusing lens moving in an optical axis direction in accordance with a subject distance.

<8>

An imaging device including:

a variable focal distance lens system; and an imaging element that converts an optical image formed by the variable focal distance lens system into an electrical signal, wherein the variable focal distance lens system includes a first lens unit constituted by at least one lens group, a second lens unit constituted by a first freeform-curved surface lens and a second freeform-curved surface lens, and a third lens unit constituted by at least one lens group, the variable focal distance lens system including the first to third lens units in this order from an object side to an image side, the first lens unit and the third lens unit are constituted by a lens having a shape rotationally symmetrical to an optical axis and are disposed on the same optical axis, the first freeform-curved surface lens and the second freeform-curved surface lens are formed to have the same shape and are disposed to be rotated at 180 degrees about an optical axis, the first freeform-curved surface lens and the second freeform-curved surface lens are movable in a Y-axis direction when optical axes of the first lens unit and the third lens unit are set to be a Z-axis, an axis perpendicular to the Z-axis on an image surface is set to be a Y-axis, and an axis perpendicular to the Y-axis and the Z-axis on the image surface is set to be an X-axis, a refractive power of the second lens unit is variable due to the first freeform-curved surface lens and the second freeform-curved surface lens moving in opposite directions, and the first freeform-curved surface lens and the second freeform-curved surface lens are moved in the Y-axis direction in association with movement of some of lens groups constituting the first lens unit and the third lens unit when positional states of the lenses are changed from a wide-angle end state in which a focal distance is shortest to a telephoto end state in which a focal distance is longest.

REFERENCE SIGNS LIST

1 Variable focal distance lens system
2 Variable focal distance lens system
3 Variable focal distance lens system
U1 First lens unit
U2 Second lens unit
U3 Third lens unit
G1 First lens group
G2 Second lens group
G3 Third lens group
G4 Fourth lens group
G5 Fifth lens group
G6 Sixth lens group
G7 Seventh lens group
G8 Eighth lens group
L3 First freeform-curved surface lens
L4 Second freeform-curved surface lens
S Aperture diaphragm
100 Imaging device
10 Imaging element

The invention claimed is:

1. A variable focal distance lens system comprising:
a first lens unit constituted by at least one lens group of a first plurality of lens groups;
a second lens unit constituted by a first freeform-curved surface lens and a second freeform-curved surface lens; and
a third lens unit constituted by at least one lens group of a second plurality of lens groups, wherein
the first lens unit, the second lens unit, and the third lens unit are in this order from an object side to an image side,
each of the first lens unit and the third lens unit further comprises a lens that is rotationally symmetrical to an optical axis,
the lens is on the optical axis,
a shape of the first freeform-curved surface lens is same as a shape of the second freeform-curved surface lens,
the first freeform-curved surface lens and the second freeform-curved surface lens are rotated, about the optical axis, at 180 degrees,
the first freeform-curved surface lens and the second freeform-curved surface lens are movable in a Y-axis direction when optical axes of the first lens unit and the third lens unit are set to be a Z-axis,
a Y-axis is perpendicular to the Z-axis on an image surface, an X-axis is perpendicular to each of the Y-axis and the Z-axis on the image surface, a direction of a movement of the first freeform-curved surface lens in the Y-axis direction is opposite to a direction of a movement of the second freeform-curved surface lens in the Y-axis direction, a refractive power of the second lens unit varies based on the direction of the movement of the first freeform-curved surface lens being opposite to the direction of the movement of the second freeform-curved surface lens, the movement of the first freeform-curved surface lens in the Y-axis direction, the movement of the second freeform-curved surface lens in the Y-axis direction, and a movement of one of the at least one lens group of the first plurality of lens groups or the at least one lens group of the second plurality of lens groups are based on a change of a positional state of each lens of the first lens unit, the second lens unit, and the third lens unit from a wide-angle end state to a telephoto end state, a focal distance of the variable focal distance lens system in the wide-angle end state is shorter than a focal distance of the variable focal distance lens system in the telephoto end state, the following Conditional Expression (1) is satisfied $$0.03 < \Delta P2/Z < 0.35 \qquad (1),$$

Here, $\Delta P2$: $\varphi 2T/\varphi 2W$, $\varphi 2T$: a first refractive power of the second lens unit in the telephoto end state, $\varphi 2W$: a second refractive power of the second lens unit in the wide-angle end state, Z: ft/fw, ft: the focal distance of the variable focal distance lens system in the telephoto end state, fw: the focal distance of the variable focal distance lens system in the wide-angle end state, and the refractive power of the second lens unit includes at least one of the first refractive power or the second refractive power.

2. The variable focal distance lens system according to claim 1, wherein the following Conditional Expression (2) and Conditional Express (3) are satisfied $$0.1 < |\Delta LA|/ft < 0.3 \qquad (2)$$

$$0.1 < |\Delta LB|/ft < 0.3 \qquad (3)$$

Here, $\Delta LA$: an amount of the movement of the first freeform-curved surface lens in the Y-axis direction from the wide-angle end state to the telephoto end state, $\Delta LB$: an amount of the movement of the second freeform-curved surface lens in the Y-axis direction from the wide-angle end state to the telephoto end state, and ft: the focal distance of the variable focal distance lens system in the telephoto end state.

3. The variable focal distance lens system according to claim 2, further comprising an aperture diaphragm in a vicinity of the second lens unit, and the following Conditional Expression (4) is satisfied $$|\Delta P|/fw < 0.7 \qquad (4)$$

Here, $\Delta P$: a maximum value of a length, along the Z-axis, from the aperture diaphragm to the second lens unit, and fw: the focal distance of the variable focal distance lens system in the wide-angle end state.

4. The variable focal distance lens system according to claim 3, wherein the following Conditional Expression (5) is satisfied.

$$0.9 < |\Delta LA|/|\Delta LB| < 1.1 \qquad (5)$$

Here, $\Delta LA$: the amount of the movement of the first freeform-curved surface lens in the Y-axis direction from the wide-angle end state to the telephoto end state $\Delta LB$: the amount of the movement of the second freeform-curved surface lens in the Y-axis direction from the wide-angle end state to the telephoto end state.

5. The variable focal distance lens system according to claim 4, wherein the first lens unit further includes:

a first lens group of the first plurality of lens groups that has a positive refractive power, and a second lens group of the first plurality of lens groups that has a negative refractive power, wherein the first lens group and the second lens group are in this order from the object side to the image side, at least the second lens group is moved in an optical axis direction of the optical axis based on the change in the positional state of each lens of the first lens unit, the second lens unit, and the third lens unit from the wide-angle end state to the telephoto end state, an interval between the first lens group and the second lens group is increased based on the movement of the second lens group in the optical axis direction, and an interval between the second lens group and the second lens unit is decreased based on the movement of the second lens group in the optical axis direction.

6. The variable focal distance lens system according to claim 5, wherein the third lens unit further includes a focusing lens which is movable in the optical axis direction based on a subject distance.

7. An imaging device, comprising:

a variable focal distance lens system configured to form an optical image; and an imaging element configured to convert the optical image into an electrical signal, wherein the variable focal distance lens system includes:

a first lens unit that comprises at least one lens group of a first plurality of lens groups;

a second lens unit that comprises a first freeform-curved surface lens and a second freeform-curved surface lens; and a third lens unit that comprises at least one lens group of a second plurality of lens groups, wherein the first lens unit, the second lens unit, and the third lens unit are in this order from an object side to an image side, each of the first lens unit and the third lens unit further comprises a lens that is rotationally symmetrical to an optical axis, the lens is on the optical axis, a shape of the first freeform-curved surface lens is same as a shape of the second freeform-curved surface lens, the first freeform-curved surface lens and the second freeform-curved surface lens are rotated, about the optical axis, at 180 degrees, the first freeform-curved surface lens and the second freeform-curved surface lens are movable in a Y-axis direction when optical axes of the first lens unit and the third lens unit are set to be a Z-axis, a Y-axis is perpendicular to the Z-axis on an image surface, an X-axis is perpendicular to each of the Y-axis and the Z-axis on the image surface, a direction of a movement of the first freeform-curved surface lens in the Y-axis direction is opposite to a direction of a movement of the second freeform-curved surface lens in the Y-axis direction, a refractive power of the second lens unit varies based on the direction of the movement of the first freeform-curved surface lens being opposite to the direction of the movement of the second freeform-curved surface lens, the movement of the first freeform-curved surface lens in the Y-axis direction, the movement of the second freeform-curved surface lens in the Y-axis direction, and a movement of one of the at least one lens group from the first plurality of lens groups or the at least one lens group of the second plurality of lens groups are based on a change of a positional state of each lens of the first lens unit, the second lens unit, and the third lens unit from a wide-angle end state to a telephoto end state, a focal distance of the variable focal distance lens system in the wide-angle end state is shorter than a focal distance of the variable focal distance lens system in the telephoto end state, the following Conditional Expression (1) is satisfied $$0.03 < \Delta P2/Z < 0.35 \qquad (1),$$

Here, $\Delta P2: \varphi 2T/\varphi 2W,$ $\varphi 2T$: a first refractive power of the second lens unit in the telephoto end state, $\varphi 2W$: a second refractive power of the second lens unit in the wide-angle end state, Z: ft/fw, ft: the focal distance of the variable focal distance lens system in the telephoto end state, fw: the focal distance of the variable focal distance lens system in the wide-angle end state, and the refractive power of the second lens unit includes at least one of the first refractive power or the second refractive power.

* * * * *